US007109850B2

United States Patent
Kawazoe et al.

(10) Patent No.: US 7,109,850 B2
(45) Date of Patent: Sep. 19, 2006

(54) RUMBLE STRIP RESPONSIVE SYSTEMS

(75) Inventors: Hiroshi Kawazoe, Falls Church, VA (US); Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 195 days.

(21) Appl. No.: 10/811,148

(22) Filed: Mar. 29, 2004

(65) Prior Publication Data

US 2005/0236210 A1    Oct. 27, 2005

(51) Int. Cl.
*B60Q 1/00*    (2006.01)
(52) U.S. Cl. .................... 340/425.5; 340/438; 701/1; 701/45; 701/213
(58) Field of Classification Search ............. 340/425.5, 340/933, 435, 436, 437, 438; 701/1, 45, 701/213; 702/47, 208, 56
See application file for complete search history.

(56) References Cited

U.S. PATENT DOCUMENTS

| 4,701,069 | A | 10/1987 | Whitney |
|---|---|---|---|
| 5,582,490 | A | 12/1996 | Murray |
| 5,676,490 | A | 10/1997 | Nelson |
| 6,014,595 | A | 1/2000 | Kobayashi |
| 6,210,071 | B1 | 4/2001 | McSharry |
| 6,220,783 | B1 | 4/2001 | Maxwell |
| 6,259,374 | B1* | 7/2001 | Kisner et al. ............... 340/905 |
| 6,364,419 | B1 | 4/2002 | Cannizzo et al. |
| 6,454,490 | B1 | 9/2002 | Murphy |
| 6,937,165 | B1* | 8/2005 | Rogers ...................... 340/963 |
| 2002/0149161 | A1 | 10/2002 | Smith |
| 2003/0121737 | A1 | 7/2003 | Koh |
| 2003/0195667 | A1 | 10/2003 | Tange et al. |
| 2005/0270179 | A1* | 12/2005 | Sherman et al. ............ 340/933 |

FOREIGN PATENT DOCUMENTS

WO    WO01/71372 A2    9/2001

* cited by examiner

*Primary Examiner*—Daryl C Pope
(74) *Attorney, Agent, or Firm*—Foley & Lardner LLP

(57) ABSTRACT

An embodiment of the present invention includes a device to alter transfer characteristics of a road departure warning installation installed on a road to a driver of a vehicle, including a rumble strip sensor to sense input from a rumble strip and an adjustable vehicle component in communication with the rumble strip sensor, the adjustable vehicle component configured to automatically adjust to increase an amount of input from the rumble strip sensed by the driver. Another embodiment of the present invention includes a device to estimate lateral displacement of a vehicle based on the location of a rumble strip installed on a road with respect to the vehicle, the device including a processor configured to receive four signals indicative of contact of a rumble strip with respective associated four tires of the vehicle and to estimate a lateral distance that the vehicle has traveled beyond the detected rumble strip.

57 Claims, 21 Drawing Sheets

CALCULATION OF THE LATERAL SPEED AT DEVIATION

CALCULATION OF THE HEADING ANGLE AT DEVIATION

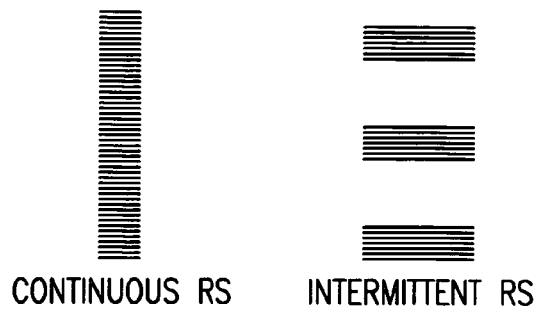
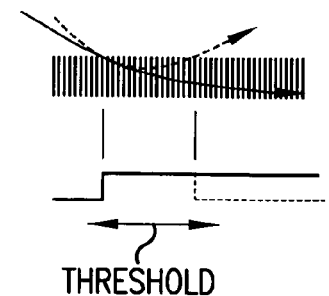
FIG.8        FIG.9
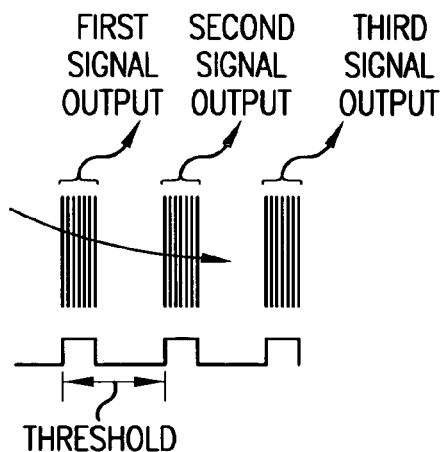
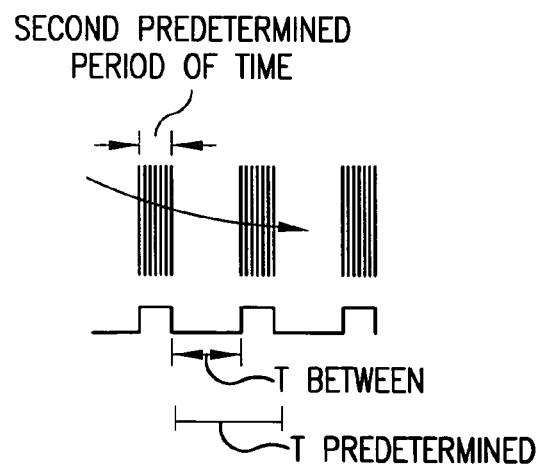
FIG.10       FIG.11

RUMBLE STRIP RESPONSIVE SYSTEMS

CROSS-REFERENCE TO RELATED APPLICATIONS

This application relates to a co-pending U.S. application Ser. No. 10/811,149 by Hiroshi Kawazoe and Hiroshi Tsuda, entitled Rumble Strip Responsive Systems filed concurrently herewith, the contents of which are incorporated herein in their entirety.

BACKGROUND OF THE INVENTION

Vehicle road departure is the cause of about 40% of all traffic fatalities in the United States. Road departures include both a vehicle driving off a road or off the shoulder of the road, and a vehicle crossing lanes into an oncoming lane on an undivided road. Inattentive driving and/or driving while drowsy tends to lead to road departures. In an effort to combat this, transportation authorities have begun to place rumble strips into roads. Rumble strips are bumps or indentations in the surface of a road such that when a vehicle's tire drives over a rumble strip, noise and/or vibration is generated to make the driver aware that he or she is driving off the road. In some cases, it may be desirable to enhance the noise/vibration resulting from simple contact with the rumble strip to alert the driver that he or she is driving off the road. Still further, rumble strips of varying locations and varying patterns and shapes are used based on where the rumble strip is located in respect to the road. For example, a different type of rumble strip may be utilized to separate oncoming lanes as compared to the type of rumble strips that are used to line the sides of roads. In this regard, the present inventors have determined that there is a way to utilize information which may be obtained from rumble strip sensors to convey information to the driver of the vehicle.

SUMMARY OF THE INVENTION

In a first embodiment of the invention, there is a device adapted to transfer characteristics of a road departure warning installation installed on a road to a driver of a vehicle, comprising a rumble strip sensor adapted to sense input from a rumble strip, and an adjustable vehicle component in communication with the rumble strip sensor, the adjustable vehicle component being adapted to automatically adjust, in response to input into the rumble strip sensor from a rumble strip, to increase an amount of input from the rumble strip sensed by the driver.

In another embodiment of the invention, there is a device adapted to make a driver of vehicle aware of contact with a road departure warning installation installed on a road, comprising, a rumble strip sensor adapted to sense input from a rumble strip, and a vehicle component control device adapted to change a state of a vehicle component in communication with the vehicle component control device in response to input into the rumble strip sensor from a rumble strip.

In another embodiment of the invention, there is a device adapted to detect a road departure warning installation installed on a road that comes into contact with a tire of a vehicle comprising a rumble strip sensor adapted to sense input from a rumble strip, wherein the sensor includes, a vibration sensor in communication with at least one of a sprung mass and an unsprung mass, the vibration sensor being adapted to determine a frequency of vibration of the sprung mass or the unsprung mass and to output a signal indicative of the frequency of vibration of the sprung mass or the unsprung mass, and a processor in communication with the vibration sensor and adapted to receive the signal, wherein the processor is also adapted to analyze the signal and determine whether the frequency of vibration is indicative of tire contact with a rumble strip based on the signal.

In another embodiment of the invention, there is a device adapted to estimate lateral displacement of a vehicle based on the location of a road departure warning installation installed on a road with respect to the vehicle, comprising a processor adapted to receive four signals indicative of contact of a rumble strip with respective associated four tires of the vehicle, wherein the processor is further adapted to estimate a lateral distance that the vehicle has traveled beyond the detected rumble strip based on which of the four tires is associated with a respective signal.

In another embodiment of the invention, there is a device adapted to detect a road departure warning installation installed on a road that comes into contact with a tire of a vehicle comprising a rumble strip sensor adapted to detect the presence of a rumble strip, wherein the sensor includes a displacement sensor adapted to determine a state of displacement of a road surface relative to a location on the vehicle as the vehicle moves along the road and to output a signal indicative of the state of displacement, and a processor in communication with the displacement sensor and adapted to receive the signal, wherein the processor is also adapted to analyze the signal and determine whether the state of displacement of the road surface is indicative of the presence of a rumble strip based on the signal.

In another embodiment of the invention, there is a device adapted to determine whether a vehicle is deviating into an oncoming lane of an un-divided highway, comprising a processor adapted to receive at least a first signal indicative of contact of a rumble strip with a tire of the vehicle, wherein the processor is further adapted to receive a second signal indicative of a RADAR return of an oncoming vehicle, the processor including logic to determine that the vehicle is deviating into an oncoming lane when the processor has received the first signal and the second signal.

In another embodiment of the invention, there is a device adapted to estimate lateral displacement of a vehicle based on the location of a road departure warning installation installed on a road with respect to the vehicle, comprising, a processor adapted to receive four signals indicative of contact of a rumble strip with respective associated four tires of the vehicle, wherein the processor is further adapted to estimate a direction in which the vehicle is traveling with respect to the direction of a plurality of detected rumble strips based on information contained in the processor regarding a vehicle geometry relating to the distance between at least one location on the vehicle and at least one of the four tires.

BRIEF DESCRIPTION OF THE DRAWINGS

FIG. 8 depicts continuous and intermittent rumble strips.

FIG. 9 depicts departure scenarios on a continuous rumble strip.

FIG. 10 depicts a departure scenario on an intermittent rumble strip.

FIG. 11 depicts time periods pertinent to an embodiment of the invention in relation to intermittent rumble strips.

DETAILED DESCRIPTION OF THE PREFERRED EMBODIMENTS

Rumble Strip Input Enhancement

A first embodiment of the present invention is directed towards improving the transfer characteristics of road departure warning installation devices, such as a rumble strip, to a driver of a vehicle. That is, by practicing a first embodiment of the present invention, the driver of a vehicle coming into contact with rumble strips will be aware that the vehicle is contacting rumble strips during the period of improved transfer (e.g., the driver will "feel" more of the input).

Figure 1:
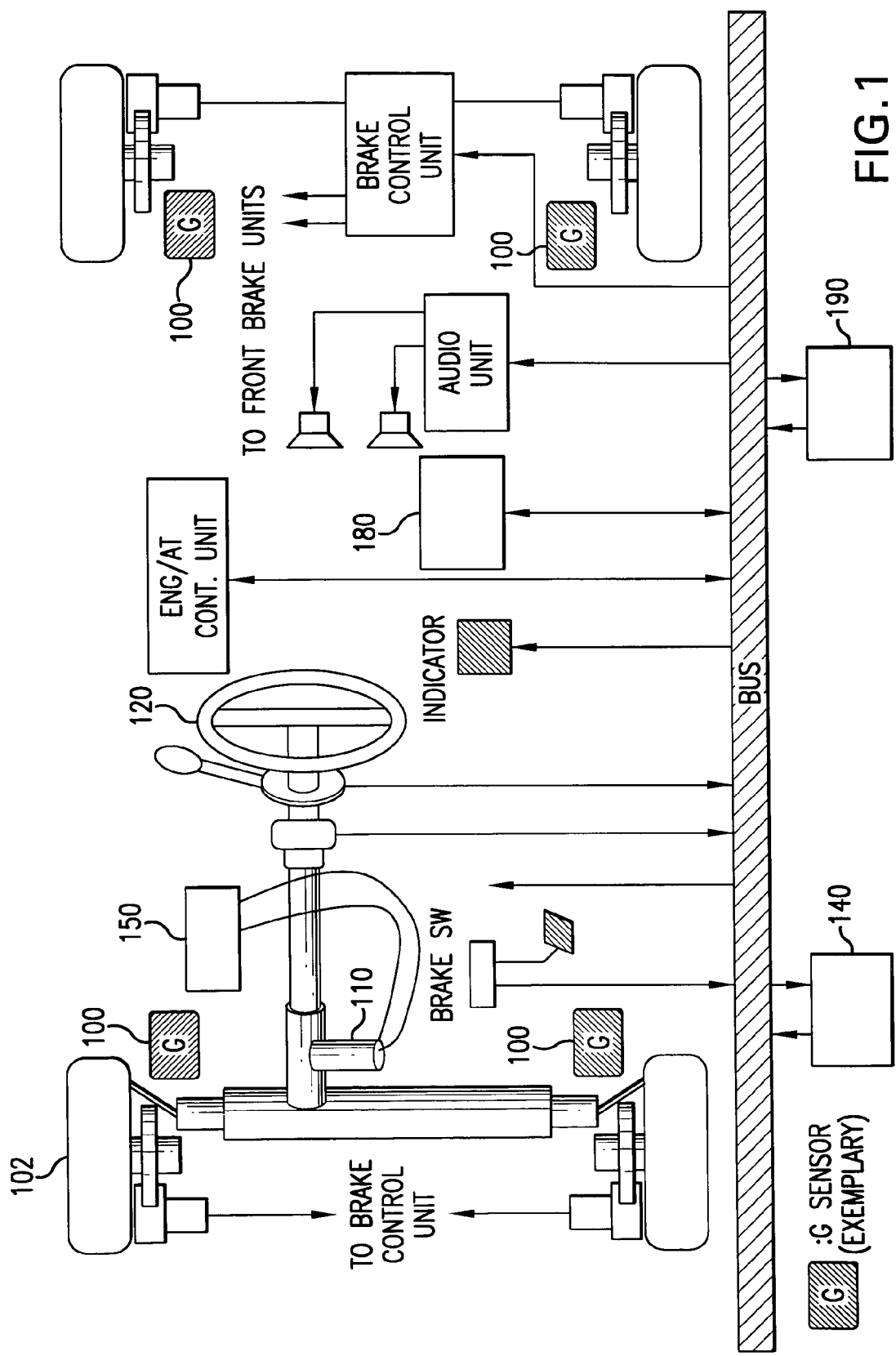
FIG. 1 shows a schematic of an embodiment according to the first invention.
Figure 2:
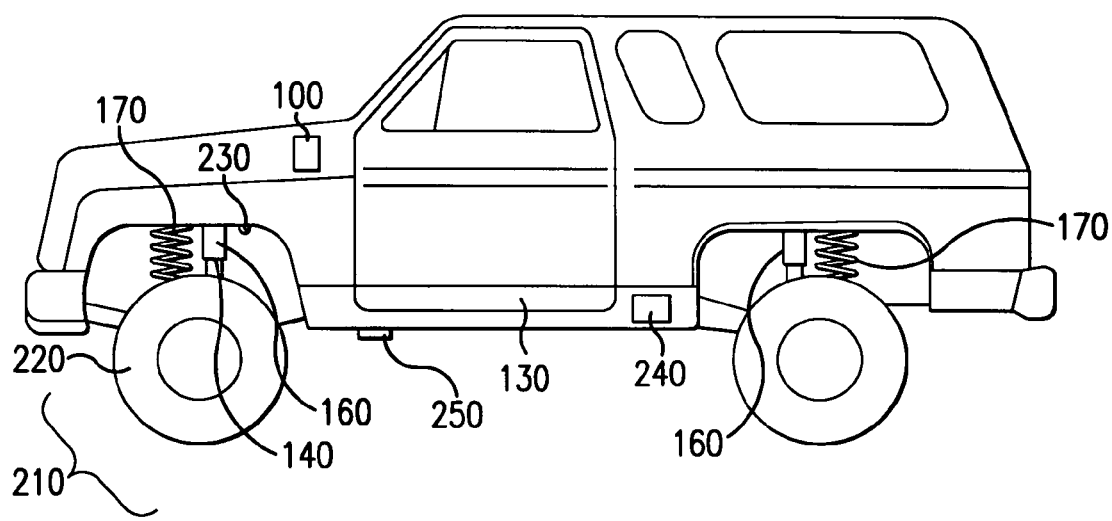
FIG. 2 shows the implementation of the first embodiment of the invention into a vehicle.

FIGS. 1 and 2 show schematic representations of a first embodiment of the present invention, which includes a device adapted to improve the transfer characteristics of a road departure warning installation, such as a rumble strip, installed on a road, to a driver of a vehicle. FIGS. 1 and 2 show a rumble strip sensor 100 which is in communication with an adjustable vehicle component, such as a hydraulic steering system control valve 110, a steering wheel 120, a vehicle suspension system 140, a hydraulic power steering circuit 150, a shock absorber 160 and a suspension spring 170. Specific details of the first embodiment will now be discussed.

The rumble strip sensor 100 according to an embodiment of the present invention is adapted to sense input from a rumble strip into a tire 102 of a vehicle. The rumble strip sensor 100 is of a configuration that can sense input from rumble strips into the tires 102 and also can determine whether or not the input sensed by the rumble strip sensor 100 is indicative of input from a rumble strip. In some embodiments of the present invention, the rumble strip sensor 100 is a self-contained unit that includes logic to determine whether sensed input is input indicative of a rumble strip. In other embodiments, the sensor 100 simply transfers the sensed input from rumble strip contact to a processor. That is, it converts the sensed input from a rumble strip into a signal that is sent to a processor where the signal is analyzed to determine whether or not the signal generated by the sensor 100 is indicative of input from a rumble strip. In yet other embodiments of the present invention, the rumble strip sensor 100 is a sensor that is adapted to only sense input from a rumble strip. That is, the rumble strip sensor 100 is of a configuration that is responsive only to input from a rumble strip into the tire 102. In yet further embodiments of the present invention, rumble strip sensor 100 can be any sensor that is of a configuration that will sense input from a rumble strip and determine whether or not that input is indicative of input from a rumble strip.

A first embodiment of the present invention can also include an adjustable vehicle component in communication with the rumble strip sensor 100. The adjustable vehicle component of the first embodiment of the present invention can automatically increase an amount of input from the rumble strip that is sensed by the driver. That is, by increasing the amount of input from the rumble strip that is sensed by the driver, the driver might be more likely to recognize that he or she is driving on the rumble strip and take corrective action.

An example of an adjustable vehicle component is the hydraulic steering system control valve 110. The hydraulic steering system control valve 110 may be configured such that a resonant frequency of the control valve can be adjusted to increase the amount of input from the rumble strip sensed by the driver through, for example, the steering wheel. This adjustment in the resonant frequency of the control valve to increase the amount of input from the rumble strip sensed by the driver occurs in response to input into the rumble strip sensor 100 from the rumble strip.

Another example of an adjustable vehicle component in communication with the rumble strip sensor 100 according to the present invention includes the steering wheel 120. The steering wheel 120 can be adapted so that the resonant frequency of the steering wheel can be adjusted to increase the amount of input from the rumble strip sensed by the driver in response to input into the rumble strip sensor from a rumble strip. As with the hydraulic steering system control valve 110 discussed immediately above, this embodiment of the invention is directed towards increasing the input from the rumble strip that is sensed by the driver through his or her hands as the driver holds onto the steering wheel 120. In an exemplary embodiment, the adjustable vehicle component is adapted to adjust the resonant frequency so that the vibration from the steering wheel into the driver's hands is substantially increased when the vehicle contacts rumble strips.

Another embodiment of the present invention includes adjustment of the resonant frequency of a body 130 of the vehicle to increase the amount of input from the rumble strip sensed by the driver in response to input into the rumble strip sensor from a rumble strip. This embodiment can operate in a similar manner to the adjustment of the resonant frequency of the steering wheel except that the resonant frequency of the body 130 is adjusted, not just the steering wheel. Thus, the driver can sense an increased input from the rumble strip through not only the steering wheel but also through, for example, the seat, the brake and/or the gas pedal, as well as, for example, hearing the entire vehicle shake. In this embodiment, the amount of input from the rumble strip sensed by the driver can be considered to increase as a result of a general overall shaking of the vehicle. That is, for example, the driver may hear the shaking of the vehicle where the shaking of the vehicle body may be louder after the resonant frequency of the body of the vehicle is adjusted.

Another embodiment of the present invention also utilizes an increase in the amount of input from the rumble strip that is sensed by the driver through the steering wheel 120. This can be accomplished by utilizing a vibration transfer device that is configured to transfer unsprung mass vibration of a vehicle suspension generated by input from the rumble strips to a hydraulic power steering circuit 150. This hydraulic power steering circuit 150 is in communication with steering wheel 120 such that the vibration that is transferred to the hydraulic power steering circuit 150 is further transferred to the steering wheel 120. As with some of the embodiments discussed above, the driver senses increased input from the rumble strips through his or her hands.

In a further variant of the present invention utilizing a steering wheel to transfer an increased amount of input from a rumble strip to the driver, the steering wheel 120, which is in communication with the control valve 110 having an adjustable resonant frequency, as discussed above, where the resonant frequency of the control valve is adjusted to substantially match an unsprung mass vibration of a vehicle suspension generated by the rumble strips so that hydraulic pulsation of hydraulic fluid in the control valve is increased, thus causing the steering wheel to vibrate and thereby increasing the amount of input from the rumble strip sensed by the driver. By the term substantially match unsprung mass vibration, it is meant that the resonant frequency of the control valve is close enough to the unsprung mass vibration of the vehicle suspension so that the hydraulic pulsation of hydraulic fluid may be sufficiently increased to heightened input from the rumble strips sensed by the driver.

In the further embodiment of the present invention, there is an adjustable vehicle suspension system 140 in communication with a rumble strip sensor 100. This vehicle suspension system 140 is configured to automatically adjust itself or to permit automatic adjustment in response to input into the rumble strip sensor from a rumble strip so that the amount of input from the rumble strip sensed by the driver is increased. The adjustable vehicle suspension system 140 may include a shock absorber 160 (the term shock absorber as used in this specification and claims also includes struts) and/or a suspension spring 170. In embodiments including a shock absorber 160, the dampening factor of the shock absorber can be adjusted so that the amount of input from the rumble strip that is sensed by the driver is increased. In some rumble strip encounter scenarios, the dampening factor is increased, while in other scenarios, the dampening factor is decreased to increase the amount of input from the rumble strips sensed by the driver. In embodiments where the adjustable vehicle suspension system includes a suspension spring 170, the spring constant of the spring is automatically adjusted to increase the amount of input from the rumble strip sensed by the driver. Some rumble strip encounter scenarios may result in an increase in the spring constant of the spring 170, while other rumble strip encounter scenarios may result in a decrease in the spring constant to increase the amount of input from the rumble strip.

It is further noted that other embodiments of the present invention can use different system components to increase the amount of input from a rumble strip that is sensed by the driver. Thus, some embodiments of the present invention may be utilized with any such device, component, etc., that will increase the input from a rumble strip that is sensed by a driver of a vehicle.

Also, it is noted that while the above and below embodiments are sometimes described in terms of a device, in general, for implementing the present invention (and in terms of sensors and processors, in particular), the present invention also includes a method and system for implementing the various embodiments of the invention. For example, the present invention also includes a method of and a system for making the driver aware that a vehicle is contacting rumble strips by adjusting the vehicle suspension system as described above.

Rumble Strip Contact Awareness

Other embodiments of the invention will now be discussed. These embodiments differ from the embodiments discussed above in that the above embodiments enhance input from the rumble strips. In the above embodiments, the input felt by the driver is still input generated from contact with the rumble strip. That is, energy imparted into the vehicle through contact with the rumble strip is felt by the driver in an enhanced form. In the embodiments described below, the vibration that is felt by the driver is not caused by the energy from the rumble strips imparted into the vehicle but caused by a release of energy from another source (such as a battery).

Such embodiments of the present invention can utilize a vehicle component to make a driver aware that he or she is driving on a rumble strip not by increasing the input generated from contact with the rumble strip sensed by the driver, but by providing an indication, such as a flashing light, to the driver that he or she is driving on rumble strips. An example of this is a device that includes a rumble strip sensor 100 that is adapted to sense input from a rumble strip, the device being in communication with a vehicle component control device 180 that is adapted to change a state of a vehicle component, such as a light, which is also in communication with the vehicle component control device 180 in response to input into the rumble strip sensor 100 from a rumble strip. According to this embodiment, a state of a vehicle component, such as, for example, a cabin interior light, is changed by a command from the vehicle component control device 180. For example, when the rumble strip sensor 100 senses input from a rumble strip, the vehicle component control device 180 could turn the light on, or if the light is already on, turn the light off in response to input into the rumble strip sensor from the rumble strip. Other examples according to this embodiment of the invention include an automatically tightening driver's seat belt, a power door window and/or a power door lock that is in communication with the vehicle component control device 180. In embodiments having one or more of these components, the vehicle component control device 180 can issue a command to automatically tighten the driver's seat belt, to automatically lower or raise the powered door window, and/or to automatically lock and/or unlock the power door lock, respectively, when the rumble strip sensor 100 senses input from a rumble strip.

Another example according to this embodiment, includes an aerosol dispenser with a nozzle mounted in the vehicle cabin, where the component control device 180 enables the aerosol spray to emit a fragrance. That is, the aerosol spray typically does not emit a fragrance, but upon the rumble strip sensor sensing input from a rumble strip, the vehicle component control device 180 enables the aerosol dispenser to emit the fragrance thus changing the state of the aerosol dispenser. In some embodiments of the invention, this fragrance can have a pungent smell which is known to heighten an awareness of a typical human being. Such an embodiment could be useful in a situation where a drowsy driver who is driving on rumble strips smells the fragrance and becomes less drowsy, and thus more alert.

Yet another example of this embodiment includes a vibrator as a vehicle component that is activated in response to input into the rumble strip sensor from a rumble strip. The vibrator could be, for example, an electric vibrator installed into the seat and/or into the steering wheel/steering column such that when the component vibrates, the vibration is felt by the driver. Thus, in some embodiments of the invention, this vibrator can be in mechanical communication with a steering wheel, a driver's seat and/or a gas petal such that when it is activated, it vibrates a respective component.

Rumble Strip Detection

Some embodiments of the present invention also include a device/method/system for detecting a road departure warning installation, such as a rumble strip, that is installed on the road that comes into contact with a tire of a vehicle. In the first example according to such embodiments of the invention, there is a rumble strip sensor that is adapted to sense input from a rumble strip inputted into the tires of the vehicle. The rumble strip sensor can include a vibration sensor that is in communication with a sprung mass and/or an unsprung mass. The vibration sensor can be adapted to determine the frequency of vibration of the sprung mass and/or the unsprung mass and output a signal indicative of the frequency of vibration of the sprung mass or the unsprung mass. That is, when the sprung mass or the unsprung mass vibrates as a result of input from the rumble strips into the tires of the vehicle, the vibration sensor can detect this vibration and convert the mechanical vibrational energy into an electronic signal that can be analyzed by, for example, a processor (described in greater detail below).

An example of the function of a vibration sensor according to the present invention will now be described. Input frequencies of rumble strips may be predetermined and stored onboard the vehicle for various vehicle speeds. For example, if the vehicle is driving at 55 miles per hour, the rumble strip input frequency might be 80 hertz. Thus, the vibration sensor would output a signal indicating that the sensor is sensing vibration at 80 hertz. The processor 190, receives this signal, and determines that the vibration sensor is sensing the vibration at 80 hertz. The processor then compares this to the predetermined stored values of vibrations in for example, a lookup table, that are indicative of vehicle tire contact with a rumble strip for a given speed. For example, at 55 miles per hour, the processor may consider vibrations between 70 hertz and 90 hertz to be indicative of contact with a rumble strip, but if the processor receives a signal of only 65 hertz, the processor may consider this to not be indicative of contact with a rumble strip.

A vibration sensor according to the present embodiment may include a gravity sensor. In some embodiments of the invention, a gravity sensor may be a device that senses a vertical acceleration and/or a up-down acceleration. In some embodiments, it determines an acceleration (e.g., $m/s^2$, G, etc.) and outputs a voltage in proportion to the determined acceleration. In yet other embodiments, it may output a signal indicative of the determined acceleration. Still further, other embodiments of the invention may be practiced with a gravity sensor that simply converts a sensed acceleration to a proportional output voltage (e.g., there is no actual value determined for the acceleration). In some embodiments, and device, method or system that may be used to identify acceleration may be used to as a gravity sensor.

As touched on above, the rumble strip sensor can also include a processor 190 that is in communication with the vibration sensor and adapted to receive the signal from the vibration sensor. The processor can be of a configuration such that the processor can analyze this outputted signal from the vibration sensor and determine whether the frequency of vibration sensed by the vibration sensor is indicative of tire contact with the rumble strip. That is, the processor can analyze the signal and determine that the frequency of vibration is of a frequency that is indicative of tire contact with the rumble strip.

In some embodiments of the invention, the processor 190 can be used to analyze other signals, such as a signal indicative of the state of a dampening portion of a shock absorber in the vehicle. A shock absorber on a vehicle has a dampening portion which changes state when a vehicle tire receives input from, for example, a rumble strip, a bump in the road, pothole, etc. The processor 190 can be in communication with a shock absorber assembly of the vehicle and receive a signal from the shock absorber assembly that is indicative of the state of the dampening portion in the shock absorber. The processor 190 can be adapted to receive this signal and analyze the signal to determine whether the shock absorber is indeed absorbing shock indicative of contact of a vehicle tire with a rumble strip (as opposed to, say, a pothole). The processor may contain a lookup table containing information regarding the state of a dampening portion of the shock absorber when a tire of the vehicle is in contact with a rumble strip, and thus determine that the signal from the shock absorber assembly is indicative of the state of a dampening portion of the shock absorber when there is tire contact with a rumble strip. Such determination could be vehicle speed dependent, or be speed independent. More detailed embodiments utilizing a shock absorber assembly to determine contact with rumble strips will now be described.

In some embodiments of the invention that utilize a shock absorber assembly to output a signal indicative of the state of a dampening portion of the shock absorber, the assembly is adapted to output a signal that is indicative of the pressure within the dampening portion, a change in pressure within the dampening portion, and/or a rate of change in the pressure of the dampening portion of the shock absorber. The processor 190 can be adapted to receive and analyze the outputted signal and determine whether the outputted pressure, change of pressure and/or the output of rate of change of pressure in the dampening portion of the shock absorber is indicative of tire contact with a rumble strip based on the signal, again utilizing, for example and not by limitation, a lookup table containing stored ranges. The processor 190 can also be in communication with a wheel assembly of a vehicle that is adapted to output a signal indicative of the state of compression in a tire portion 220 of the wheel assembly 210. When the tire portion 220 of the wheel assembly 210 comes into contact with a rumble strip, the tire, being made out of rubber or a similar elastomeric material, will compress (and then expand) or vice versa. The wheel assembly 210 can be adapted to output a signal that is indicative of the state of compression in the tire portion 220. This signal can be received by the processor 190 and analyzed by the processor to determine whether the state of compression in the wheel assembly 210 is indeed indicative of tire contact with a rumble strip. In one example of this embodiment, the wheel assembly 210 can be configured to output a signal that is indicative of pressure, a change in pressure, and/or rate of change in pressure in the tire 220. The processor 190 can receive this signal and analyze the signal to determine whether the pressure, change in pressure, and/or the rate of change in pressure of the tire portion is indicative of contact of the tire portion with a rumble strip. In other embodiments of the present invention, a strain gauge, for example, can be attached to the tire portion of the wheel assembly 210 to determine a change in strain, or a rate of change of strain in the tire portion 220 of the wheel assembly 210. The wheel assembly 210 may also be configured to output a signal indicative of the state of rotation of at least a portion of the wheel assembly, which can include, for example, the tire portion 220 and/or the hub of the wheel assembly and/or an axle of the wheel assembly. The processor 190 can receive this outputted signal and analyze the signal to determine whether a change of state of rotation of this portion of the wheel assembly is indicative of contact of the tire with a rumble strip. The wheel assembly 210, according to this embodiment, can be adapted to output a signal that is indicative of the rotation speed, the change in rotation speed, and/or a rate of change of rotation speed of the rotating portion of the wheel assembly, the processor 190 being adapted to analyze the signal and determine whether the outputted signal contains data indicative of tire contact with a rumble strip. By way of example and not by way of limitation, if the processor 190, after analyzing the signal, determines that the rotation speed of the rotating portion is increasing by 5 revolutions per second and then decreasing by 5 revolutions per second, the processor may determine, based on the vehicle speed, that this change in rotation of the rotating portion of the wheel assembly is indicative of contact with rumble strips. By way of further example and not by way of limitation, a wheel speed sensor may be used to determine that the vehicle is contacting a rumble strip. In an exemplary embodiment, a wheel speed sensor may be composed of a rotor with projections, much like a gear, and a magnetic pickup. The sensor outputs pulses when the projections pass by the magnetic pickup. A processor may analyze the pulses and determine a wheel rotation speed by a frequency of the pulse input. For example, at about 60 kph, the frequency may be about 400 Hz. When a tire contacts rumble strips, the tire may vibrate in the direction of the tire rotation. Consequently, a lower frequency of the pulse is added to the based frequency that indicates wheel rotation speed. For example, at about 60 kph, the frequency may be about 450 Hz. Thus, the change in the frequency of detection may be utilized to determine that the vehicle is contacting rumble strips.

Another embodiment of the invention includes a device that can detect contact with a road departure warning installation such as a rumble strip, installed on a road, with a tire of the vehicle by utilizing a microphone 230 that is adapted to output a signal indicative of the sound sensed by the microphone. The microphone can be placed in a location on the vehicle where the sound generated by the rumble strip contacting the tire can be sensed and the microphone then outputs a signal indicative of this sensed sound. The microphone 230 can be in communication with the processor 190, and the processor can be adapted to receive the outputted signal from the microphone 230. The processor can also be adapted to analyze the outputted signal from the microphone 230 and determine whether the sound sensed by the microphone is indicative of a sound that is created by tire contact with a rumble strip based on the signal outputted from the microphone 230.

Figure 3:
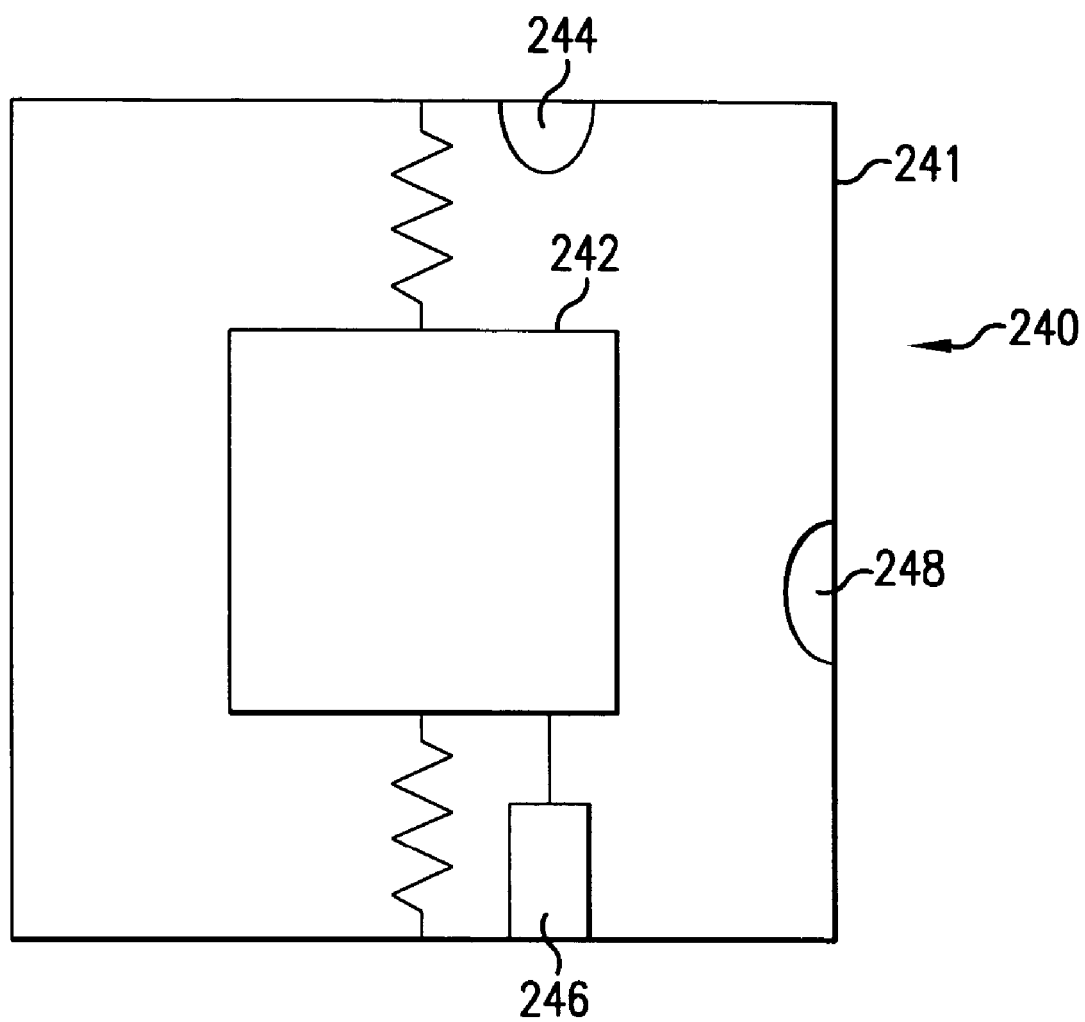
FIG. 3 shows a vibration sensor according to an embodiment of the invention.

In another example of an embodiment of the invention used to detect contact with rumble strips, there is a device that detects a rumble strip that includes a sensor adapted to sense input from the rumble strip, where the sensor includes a displacement sensor 240 that comprises a sprung mass 242, as shown in FIG. 3. The displacement sensor is configured to determine a state of displacement of the sprung mass when the sprung mass is displaced by input from a rumble strip. That is, as the vehicle tire comes into contact with the rumble strip, energy inputted into the tire causes the sensor body 241 to be displaced relative to the mass 242. The displacement sensor 240 outputs a signal indicative of a state of displacement of the sprung mass 242 to the processor 190 which is adapted to receive this signal and to analyze the signal to determine that the state of displacement of the sprung mass is indicative of tire contact with a rumble strip. A state of displacement of the sprung mass can include, for example and not by limitation, displacement speed of the sprung mass, a change in displacement speed of the sprung mass, and/or a rate of change of the displacement speed of the sprung mass. It can include location. The processor 190 can thus be configured to analyze a signal containing information indicative of the just mentioned states of displacement and determine that the vehicle tire is in contact with the rumble strips. The displacement sensor can include a distance sensor 244, a suspension stroke sensor 246 and/or an ultrasonic sensor 248 to determine the state of the mass. It can also include a visual sensor and/or a laser sensor. In some embodiments of the present invention, any type of sensor or device that can determine the state of displacement of a sprung mass can be used to practice this embodiment of the invention.

Another embodiment of the present invention utilizes the relative displacement of a road surface having rumble strips to determine whether or not a vehicle is coming into contact with rumble strips and/or to determine the presence of rumble strips. An embodiment of the present invention utilizing the displacement of a road surface includes a displacement sensor 250 that is adapted to determine a state of displacement of a road surface relative to a location on the vehicle as the vehicle moves along the road. The displacement sensor 250 may include an ultrasonic sensor, a radar sensor, a laser and/or a visual sensor that is directed towards a road surface and detects displacement of the road surface. For example, as a vehicle drives along a road, a road surface having rumble strips could be detected to repeatedly move away from the vehicle at a given frequency. Alternatively, in a road having rumble strips having the bump configuration, the road surface would repeatedly move towards the vehicle. A processor 190 can be in communication with the displacement sensor 250 and receive a signal from the displacement sensor 250 indicative of the state of displacement of the road with respect to this location on the vehicle. The processor 190 may analyze this signal and determine whether the state of displacement of the road is indeed indicative of the presence of a rumble strip based on the signal. For example, the processor could include logic to distinguish a state of displacement indicative of a rumble strip from, for example, displacement resulting from a pothole or a grated sewer, etc. A device utilizing such a displacement sensor can be configured with a displacement sensor that is adapted to output a signal that is indicative of the displacement speed, a change in displacement speed and/or a rate of change in displacement speed of the road surface relative to a location on the vehicle as well as the distance of the surface or the change in distance of the surface from the vehicle and/or relative to the road. The displacement sensor 250 would output a signal indicative of these states of displacement which could then be received by the processor 190, which analyzes the signal to determine that the data regarding the state of surface displacement from the displacement sensor 250 is indicative of the presence of a rumble strip. Some embodiments of the present invention can be practiced with any type of displacement sensor that can be configured to determine a state of displacement of the road, providing that the sensor outputs a signal that can be analyzed to determine the presence and/or absence of a rumble strip.

Vehicle-Rumble Strip Distance

Figure 4:
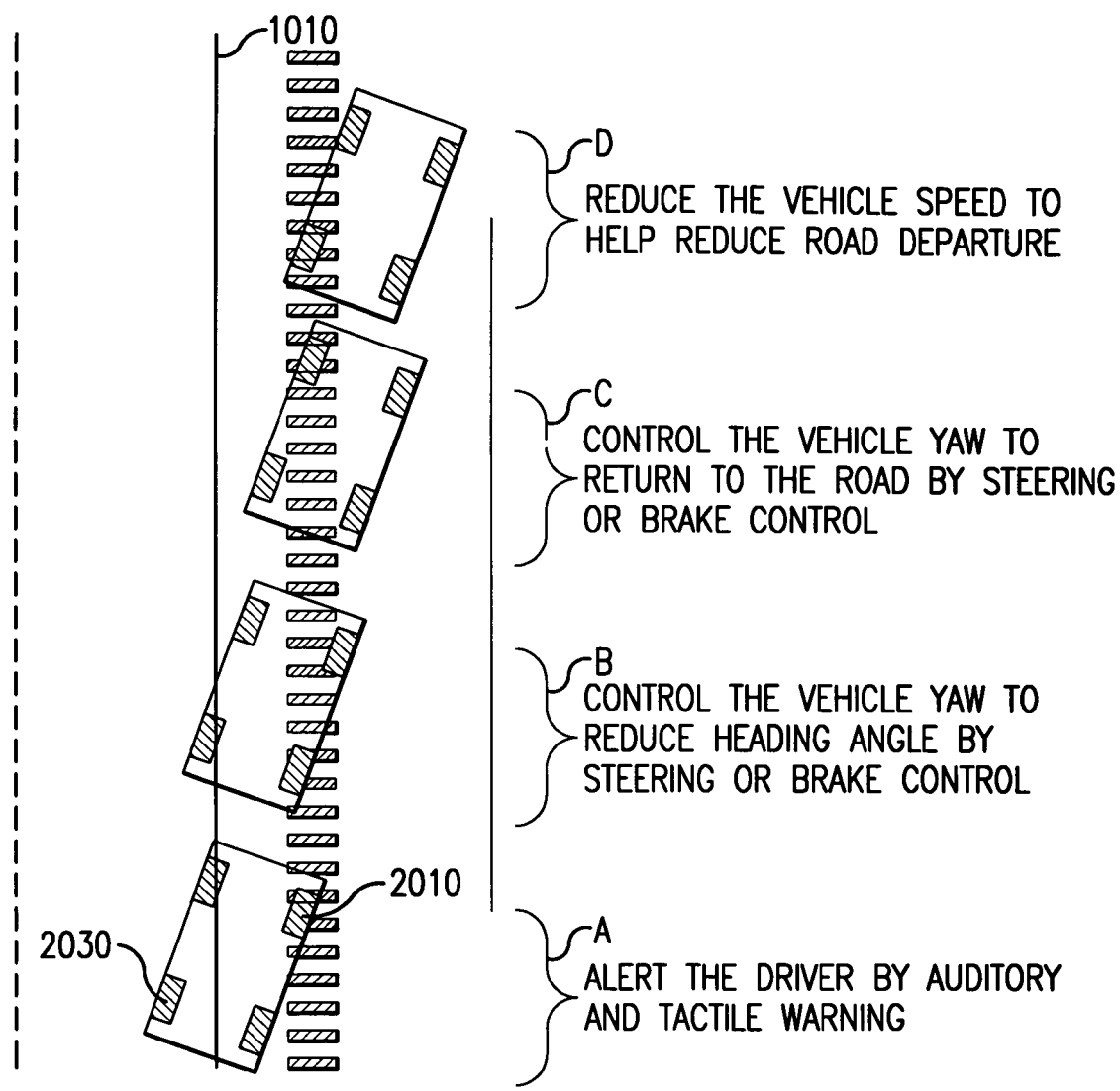
FIG. 4 depicts a vehicle as all four wheels cross a rumble strip.

In another embodiment of the present invention, there is a device that is configured to utilize rumble strips on a road to determine the distance, specifically, the lateral distance that a vehicle has traveled beyond the rumble strips. In a road departure scenario, when a vehicle begins to deviate from a road lined with rumble strips, the vehicle encounters rumble strips, and if the driver does not take corrective actions to steer the vehicle back into the lane, the vehicle will continue past the rumble strips and, eventually, if no corrective action is taken, completely off the road. Such a road departure scenario is depicted in FIG. 4. A device according to the present invention estimates the lateral displacement of a vehicle based on the location of the rumble strips with respect to the vehicle. By lateral displacement, it is meant the direction substantially normal to the direction that the rumble strips are aligned. For example, on a straight and uniform road, where the rumble strips are aligned substantially parallel to the edge of the road, the direction of lateral displacement from the rumble strips would be substantially normal to the edge of the road.

Estimation of the lateral displacement of the vehicle from the rumble strip can include the use of a processor 190 that is adapted to receive signals indicative of contact of a rumble strip with respective tires of the vehicle and to estimate or otherwise determine a lateral distance that the vehicle has traveled beyond the detected rumble strip based on these signals. One exemplary embodiment of the invention utilizes a rumble strip sensor associated with each tire of a four-tire vehicle: a front right rumble strip sensor, a front left rumble strip sensor, a rear right rumble strip sensor and a rear left rumble strip sensor. The processor is configured to receive signals from each of these sensors, and, based on which sensor is outputting a received signal, estimate the distance that the vehicle has traveled beyond the detected rumble strip. For example, if the front right sensor outputs a signal to the processor indicative of contact of the front right tire with a rumble strip, and the vehicle is driving on a US road (right side driving), the processor can estimate that the vehicle has traveled about a certain distance past the rumble strip (discussed in greater detail below) depending on the vehicle geometry (which may be the distance that a front bumper overhangs the front tire, etc.). Conversely, if the rear left sensor outputs a signal indicative of contact with a rumble strip, the processor could estimate the lateral distance of the vehicle based on the vehicle geometry. FIG. 4 shows an evolving road departure scenario where each of the four tires come into contact with a rumble strip as the vehicle departs from the lane. As can be seen from FIG. 4, at location A, only the front right tire 2010 is in contact with the rumble strip, whereas at location D, only the rear left tire 2030 is in contact with the rumble strip, and thus the rear left sensor is the only sensor outputting a signal indicative of contact with the rumble strip.

As noted above, the processor can utilize information on vehicle geometry relating to the distance between specific locations on the vehicle. For example, the front right fender of the vehicle and the location of one, two, three, four (or more) tires of the vehicle. This information can be stored in the processor and utilized to estimate the lateral distance that the vehicle has traveled beyond the detected rumble strip. In another embodiment, the processor is adapted to estimate the lateral distance that the vehicle has traveled beyond the detected rumble strips based on the order in which the signals are received by the processor, the order representing the order in which the tires of the vehicle contact a rumble strip. In another embodiment of the invention, the processor is adapted to estimate a lateral distance that the vehicle has traveled beyond a detected rumble strip based on the time between receiving a first signal by the processor indicative of contact of a rumble strip with an associated tire and the receipt of a second signal by the processor indicative of contact of a rumble strip with a second associated tire. For example, if 1) it is know which tire is contacting the rumble strips and which tire previously contacted the rumble strips, 2) the distance between the tire currently contacting the rumble strips and the tire previously contacting the rumble strips is known, and 3) the time between the previous contact and the current contact is known, the direction of vehicle deviation may be estimated, and, utilizing, for example, geometry, the lateral displacement distance may be determined. In yet another embodiment of the present invention, the processor is further adapted to estimate the lateral distance that the vehicle has traveled beyond the detected rumble strip based on the longitudinal speed of the vehicle. For example if the angle of deviation from the rumble strip is known (deviation angle determination described in greater detail below) and the time from first contact with the rumble strip is also known, the lateral displacement of the vehicle can be determined based on the longitudinal velocity of the vehicle utilizing geometric principles.

The present invention includes a device adapted to issue a vehicle control command after a determination has been made that the vehicle is deviating from a lane or beginning to deviate from a lane, which may be based on the determination of contact with the rumble strips. One type of vehicle control may include vehicle yaw control or lateral control systems utilizing steer by wire, a steering control actuator installed on a steering column, or a steering gear device. Vehicle yaw control or lateral control may also be obtained by issuing commands to an electric powered and/or a hydraulic powered steering unit. Vehicle yaw control or lateral control may be accomplished by utilizing brake controls, such as a brake by wire system, a brake actuator of an antilock brake system, dynamic control systems, automatic cruise control, engine control and/or an automatic transmission control. Still further, as will be explained in greater detail below, a passive safety system may be implemented when it has been determined that the vehicle is coming into contact with rumble strips and is deviating into an oncoming lane. The present invention can be practiced with any device that alerts and/or informs the driver that the vehicle is contacting rumble strips. This can include an auditory warning, such as a buzzer, audio speaker, etc., a visual warning, such as an indicator and/or a blinking light, a tactile warning, an emitted fragrance or odor, the opening and/or closing of windows when a particular side of the vehicle or all of the windows of the vehicle, a tightening of seatbelts and/or the locking of doors. The means of alert may also result in the preparation of the vehicle for the possibility of a crash since contact with rumble strips tends to occur prior to a vehicle running off the road or into an oncoming lane when the road that the vehicle is traveling on is furnished with rumble strips.

In view of this, it is also noted that the present invention includes control of the vehicle and/or a warning issuance to a driver based on the lateral distance that the vehicle has traveled from the rumble strips. That is, a control unit can be used to automatically steer the vehicle back onto the road. A warning device as described above can also be activated. For example, referring to FIG. 4, at location A, where the front right tire 2010 first contacts the rumble strip, a warning is issued to the driver by, for example, a speaker. As the vehicle travels past the rumble strip as shown at positions B, C and D, control commands can be issued in an attempt to keep the vehicle from driving off the road. Different levels of commands/vehicle control commands/warning may be issued based on the lateral distance that the vehicle travels past the rumble strip as determined by the device just discussed above. That is, a more radical control command would be issued at position D as opposed to position B.

In yet other embodiments of the present invention, the processor is adapted to receive signals indicative of contact of a rumble strip with respect to associated tires and to estimate a direction in which the vehicle is traveling with respect to the direction of the detected rumble strips. The processor can do this, for example, utilizing information regarding vehicle geometry relating to the distance between a given location on the vehicle and one or more of the tires. A device to determine the direction in which the vehicle is traveling with respect to the rumble strips can include a processor which is adapted to estimate the direction based on the time between reception of the first signal by the processor that is indicative of a contact of a rumble strip with an associated tire and reception of a second signal by the processor that is indicative of contact of a rumble strip with an associated different tire. Still further, other embodiments of the present invention include a processor that is adapted to estimate the direction in which the vehicle is traveling with respect to the direction of the plurality of the detected rumble strips based on the longitudinal speed of the vehicle.

In another embodiment of the present invention, there is a device for estimating a lateral displacement velocity (i.e., the velocity away from the rumble strips) of a vehicle. For example, the present invention includes a device to estimate the displacement velocity based on the location of rumble strips with respect to the vehicle. The device can comprise a processor which is adapted to receive a first signal and a second signal indicative of contact of a rumble strip with associated two tires of the vehicle. The processor is adapted to estimate the lateral speed at which the vehicle is traveling away from the detected rumble strip based on the time period between receipt of the first signal by the processor and receipt of the second signal by the processor, and also a tread distance, Td, between the two tires.

Figure 5A:
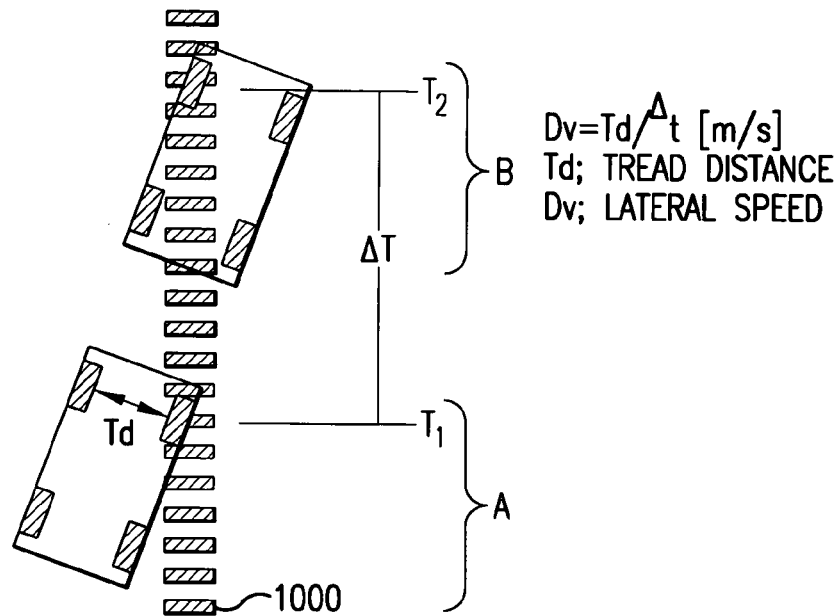
FIG. 5a depicts determination of the lateral speed of the vehicle as the vehicle crosses a rumble strip according to an embodiment of the invention.
Figure 5B:
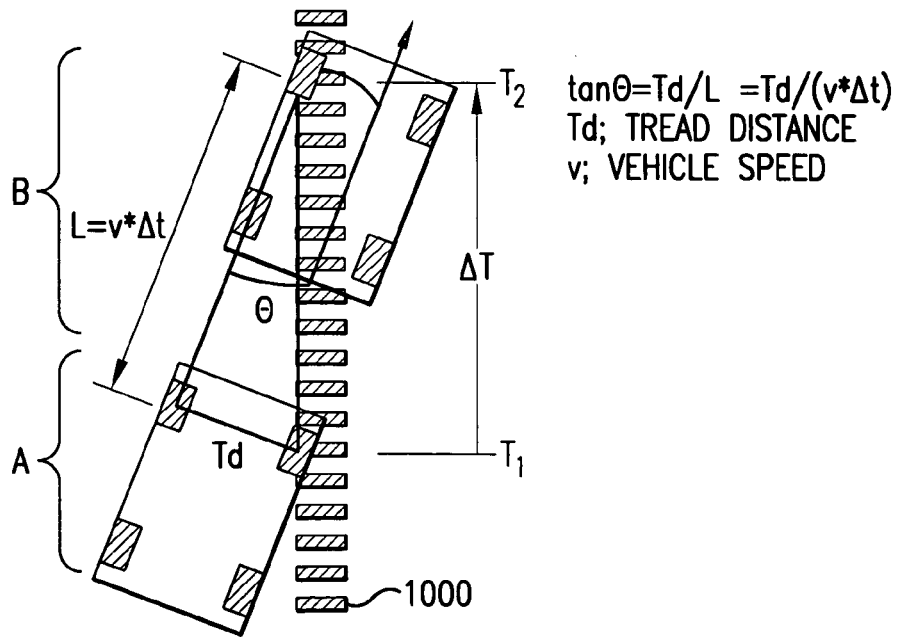
FIG. 5b depicts determination of the heading of the vehicle as the vehicle crosses a rumble strip according to an embodiment of the invention.
Figure 6:
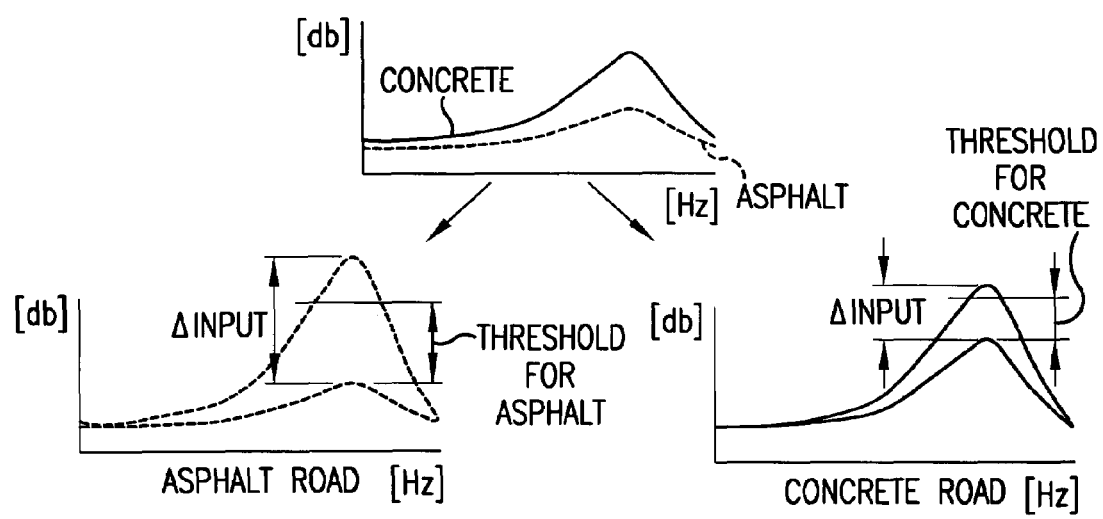
FIG. 6 depicts graphical representations of the differences in input on concrete roads and asphalt roads.

FIGS. 5 and 6 show a tread distance, Td, between two tires of the automobile. The tread distance can be the distance between a front left tire and a front right tire, or can be the distance between a rear left tire and a rear right tire. The tread distance may be measured between the inside of the respective tires or may be the distance from the outside of the respective tires, or may be the distance between the center of the front left tire and the center of the front right tire or the center of a rear left tire and the center of a rear right tire depending on the accuracy that is desired for the calculation of lateral velocity away from the rumble strips. It could also be from the outside of one tire and the inside of another tire. It may also be any other distance that is representative of lateral tire spacing.

The determination of the lateral displacement velocity away from the rumble strips is schematically illustrated in FIG. 5a. FIG. 5a shows a vehicle at position A and at position B. At position A, the vehicle's front right tire comes into contact with the rumble strip at time T1. At position B, the vehicle's front left tire comes into contact with the rumble strip at T2. The difference between times T1 and T2 is $\Delta t$, and therefore, the time period between when the first signal is received by the processor and when the second signal is received is $\Delta t$. A rumble strip sensor associated with a front right tire and a rumble strip sensor associated with the front left tire output signals indicative of contact with a rumble strip at times T1 and T2. By dividing the tread distance, Td, by $\Delta t$, the lateral displacement speed, Dv may be determined, as shown below:

$$Dv = Td/\Delta t \qquad (1)$$

where,

Td=tread distance, and $\Delta t$=time between receiving the first signal and receiving the second signal.

In one embodiment of the invention, the processor is configured to calculate Dv. However, in other embodiments of the invention, a lookup table for various tread distances, Td, and time periods, $\Delta t$, may be used to determine the lateral speed of the vehicle, as thus determination of Dv is based on Td and $\Delta t$, as in equation (1). It is noted that the term "based on," when used herein, is used broadly. That is, for example, any method or device that estimates/determines Dv utilizing information relating to Td and $\Delta t$, such as utilizing a lookup table, is still determination of Dv based on Td and $\Delta t$, just as any device or method that estimates/determines Dv utilizing information relating to equation (1) above is still determination of Dv based on equation (1). Still further, any means, device or method to determine Dv may be used to practice the present invention.

Vehicle Heading with Respect to Rumble Strip

In another embodiment of the invention, there is a device that is configured to estimate the heading of a vehicle away from a rumble strip. As with the embodiments described above, this device can include a processor. The processor according to this embodiment is adapted to receive a first signal and a second signal indicative of contact of a rumble strip with associated two tires of the vehicle, again as with the embodiment just described. However, this processor is adapted to estimate or otherwise determine an angle at which the vehicle is traveling away from the rumble strips based on the time period $\Delta t$ between when the first signal was received by the processor and when the second signal was received by the processor, along with the longitudinal vehicle speed and a tread distance between the two tires. In essence, the processor utilizes the same information as the processor described above, plus the longitudinal vehicle speed, to determine the vehicle's heading away from the rumble strips. As shown in FIG. 5b, the direction of heading away from the rumble strip θ is determined based on the opposite leg and adjacent leg of a right triangle. The opposite leg of the right triangle is the tread distance, Td, while the adjacent side of the right triangle is the distance that the vehicle travels from T1 to T2, which may then be used to determine θ. In an alternative embodiment of the invention, the processor receives input regarding the longitudinal distance (L) that the vehicle has traveled between T1 and T2 in combination with Td, to determine the angle of deviation from the rumble strips. Equations for calculating θ are seen below:

$$\tan\theta = Td/(v \cdot \Delta t) \quad (2)$$

where,

Td=tread distance, v=longitudinal speed of the vehicle, and

Δt=time between receiving the first signal and receiving the second signal.

Vehicle Deviation into Oncoming Lane

The present invention also includes a device for determining whether a vehicle is deviating into an oncoming lane of an undivided highway by determining that a vehicle is coming into contact with rumble strips. In this regard, the present invention includes a processor that is adapted to receive a first signal that is indicative of contact of a rumble strip with the tire of a vehicle, for example, from a rumble strip sensor as described above. The processor is further adapted to receive a second signal that is indicative of a sensor sensing an oncoming automobile in front of the vehicle. This second signal can be from, for example, a RADAR system, and be indicative of a RADAR return or the like. Other embodiments could utilize a laser system to determine that there is an oncoming automobile ahead of the vehicle. (Indeed, any means, method or device that may be used to determine that there is an automobile ahead of the vehicle may be used to practice the present invention.) Once the processor has received the first signal indicative of contact of a rumble strip and also receives the second signal indicative of an oncoming automobile ahead of the vehicle, the processor determines that the vehicle is deviating into an oncoming lane. That is, the processor includes logic to determine that the vehicle is deviating into an oncoming lane when the processor has received the first signal indicative of contact with a rumble strip with the tire of the vehicle and the second signal indicative of the sensation of an oncoming automobile ahead of the vehicle. The processor logic further can be set so that a determination that the vehicle is deviating into an oncoming lane is made when the first signal and the second signal are received by the processor at the same time. Still further, processors can be adapted to determine a time period between receipt of the first signal indicative of contact of a rumble strip with a tire and receipt of a second signal indicative of the sensation of an oncoming vehicle, where the logic of the processor determines that the vehicle is deviating into an oncoming lane based on the time period between receipt of the first signal and receipt of the second signal.

A processor having such a configuration can be utilized to determine that a vehicle is deviating into an oncoming lane in a lane departure scenario where the automobile has partially crossed into the oncoming lane. That is, for example, the left front and left rear tires have already crossed the rumble strips, but the right front and right rear tires have not yet contacted the rumble strips, but the vehicle is still deviating into the oncoming lane. By setting a time period between receipt of the first signal and the second signal or by utilizing logic that does not require the first signal and the second signal to be received at the same time but instead permits a predetermined time period between the receipt of the first signal and the second signal to exist, vehicle deviation into an oncoming lane according to such a scenario may still be determined.

An embodiment of the present invention also includes implementation of a variable vehicle control and/or issuance of a variable warning to the driver based on whether the vehicle is deviating from the road, or whether the vehicle is deviating from one lane into an oncoming lane. That is, the commands and warnings can be different depending on whether the vehicle is deviating from the road or into an oncoming lane. For example, in the case where a vehicle is deviating off the road, the vehicle control may simply be to steer the vehicle back onto the road. Whereas, in the scenario where the vehicle deviation into an oncoming lane has been determined, the vehicle control command may be to both brake the vehicle and to steer the vehicle out of the oncoming lane into its own lane. Still further, different warning scenarios can be associated with the different deviation scenarios. For example, if the vehicle is deviating to the right off the road a voice speaker could be activated to warn the driver to steer to the right, and vice versa if the driver is deviating into an oncoming lane.

One embodiment of the present invention includes a processor which is adapted to receive a first signal indicative of contact of a rumble strip with a tire of the vehicle from a rumble strip sensor. This processor further includes logic to determine whether or not the vehicle is deviating into an oncoming lane and also to initiate a warning based on the processor's determination, as well as to initiate a plurality of warnings, based on whether or not the vehicle is deviating into an oncoming lane. For example, as noted above, if the processor determines that the vehicle is not deviating into an oncoming lane (that is the vehicle is simply deviating to the right off the road), a first warning may be issued. Whereas if the processor determines that the vehicle is deviating into an oncoming lane the processor may initiate a second warning to the driver, different from the first warning.

Such an embodiment can include a first warning device that is in communication with the processor which is adapted to issue the first warning, as well as a second warning device also in communication with the processor adapted to issue the second warning to the driver. The warnings as noted above are different. In yet other embodiments, a single warning device is in communication with the processor, the warning device being adapted to issue the first warning and/or the second warning, where the warnings are different. In some embodiments, the warning messages comprise the same audio message, the difference between the first warning and the second warning being that the first warning is louder than the second warning. In other embodiments the first audio warning is different than the second audio warning.

Embodiments of the present invention also include a processor adapted to receive a first signal indicative of contact of a rumble strip with the tire of a vehicle. The processor also includes logic to determine that the vehicle is deviating into an oncoming lane as discussed in any of the above embodiments, as well as logic to initiate a vehicle control command to either automatically steer the vehicle away from the oncoming lane and/or to automatically brake the vehicle once the processor has received the first signal indicative of contact of a rumble strip with the tire of a vehicle. The logic can also determine that the vehicle is deviating into an oncoming lane. Such a device may also include a processor having logic to initiate a warning to a driver of a vehicle if the processor has received the first signal indicative of contact of a rumble strip with a tire and has determined that the vehicle is not deviating into an oncoming lane.

Deviation into an oncoming lane may be determined utilizing other devices as well. For example, a GPS with or without a digital map of the roadway can be used to determine if a vehicle is veering onto an oncoming lane. Still further, the present invention may utilize a device that is adapted to determine what type of rumble strip the vehicle is contacting. That is, on some roadways, rumble strips in the center of the road (e.g. in-between two oncoming lanes) are of different configurations/spaced differently than rumble strips on the edges of the road. If the vehicle is equipped with a sensor or processor that can differentiate between different types of rumble strips, a determination as to whether or not the vehicle is deviating into an oncoming lane can be made. Indeed, the present invention may be utilized with any device that can provide an indication or otherwise determine whether or not a vehicle is running off the road and/or running into an oncoming lane. For example, a processor that is configured to receive a first signal that is indicative of both contact with a rumble strip and also the type of rumble strip that is coming into contact with a tire may be utilized and the processor may include logic to analyze the first signal and determine whether or not a vehicle is deviating into an oncoming lane based on the type of rumble strip in contact with the tire. Such a device can utilize a signal received from a rumble strip sensor indicative of the frequency of contact with the rumble strips and the tire. For example if the rumble strips are spaced "more closely" in-between lanes as opposed to on the edges of a road, the frequency of contact with such a rumble strip should be higher, and thus, based on the velocity of the vehicle, a processor can utilize logic to analyze the frequency and determine whether or not the vehicle is running on a center rumble strip or on a side rumble strip, and thus determine whether or not the vehicle is deviating into an oncoming lane.

Other embodiments of the present invention can fuse a vehicle based sensor and rumble strip detection sensors together to determine whether or not the vehicle is deviating into an oncoming lane. For example, a vision based sensor can be combined with a rumble detection sensor to implement the embodiments just described.

A device for implementing the above embodiment can also include a vehicle control unit which is in communication with the processor and is configured to steer and brake the vehicle. The vehicle control unit can be of an intelligent design which determines how the vehicle should be controlled, or can be of a dumb design receiving input from a processor or another device as to how the vehicle should be controlled. As with the embodiments discussed above, such a device may utilize GPS with or without a digital map to determine that the vehicle is deviating into an oncoming lane. Still further, the processor may be adapted to receive a signal indicative of the type of rumble strip in contact with the tire and thus determine whether or not the vehicle is deviating from the road. In embodiments where the signal received by the processor can be indicative of the frequency of contact with the rumble strip, the processor can be configured to utilize this information to determine what type of rumble strip is coming into contact with the tire and thus whether or not the vehicle is deviating into an oncoming lane.

Vehicle Stability Control

One embodiment of the present invention includes a device that is adapted to alter the stability characteristics, and thus the handling characteristics, of a vehicle, after the vehicle has come into contact with the road departure warning installation installed on the road, such as a rumble strip. Such a device can be configured to receive information indicative of contact of a rumble strip, and then to issue a command to change the state of a vehicle stability component or vehicle stability system once it has been determined that the vehicle is indeed coming into contact with rumble strips. One example of such a device is a processor that is adapted to receive a first signal from a rumble strip sensor indicative of contact of a rumble strip with a tire of a vehicle. This processor can include logic to determine that the vehicle is indeed deviating from the road, which may be based on the received signal, and then to issue commands to change the state of a variable vehicle stability component or variable vehicle stability system once this processor has received the signal and determined that the vehicle is deviating from the road. A variable vehicle stability component or system can include a suspension system of the vehicle. This suspension system can be automatically adjustable to increase the stability of the vehicle in response to the receipt of the command from the processor to increase vehicle stability. The vehicle suspension system can include a suspension spring or shock absorber in communication with the processor where the spring constant and/or dampening factor of the suspension spring or the shock absorber, respectively, is automatically adjustable in response to receipt of the command from the processor to alter vehicle stability. For example, the suspension springs can become stiffer and/or the dampening factor of the shock absorber may increase so that when the driver commences corrective maneuvers to steer the vehicle back onto the lane, the vehicle's handling characteristics will be better.

A variable vehicle stability component or vehicle stability system that may be used with the above-described embodiment includes a front-rear roll-rigidity proportion control unit. This control unit can be automatically adjustable to increase the stability of the vehicle in response to receipt of the command from the processor to increase vehicle stability after the processor has determined that the vehicle is deviating from the road.

Another embodiment of the present invention utilizing a variable vehicle stability control component or vehicle stability system in communication with the above-described processor includes a device that is adapted to automatically lower the height of the vehicle in response to the receipt of the command from the processor to alter vehicle stability after the processor has determined that the vehicle is deviating from the road and to issue the command to alter vehicle stability. Another embodiment of the invention includes a vehicle stability component or vehicle stability system having a variable steering gear ratio control unit which is adapted to automatically vary the steering gear ratio in response to receipt of the command from the processor to increase vehicle stability. By varying the steering gear ratio, the stability of the vehicle may thus be altered such that when the driver takes corrective action, the vehicle handles better.

It is noted that an active hydraulic suspension system and an air suspension system may be utilized to lower the vehicle height to reduce the moment of rotation during corrective steering. Still further, a shock absorber dampener control and/or a spring control system may be utilized in a front-rear roll-rigidity proportion control unit.

Still further, in a variable front-rear roll-rigidity proportion system, the vehicle stability may be increased by a change in the shock absorber dampener and/or the spring constants of the springs utilizing an active hydraulic suspension and/or air suspension system, an active dampener control suspension system, etc. Indeed, any device or method that can increase the stability of the vehicle after it has been determined that the vehicle is contacting rumble strips may be used to practice the present invention.

Rumble Strip Detection Correlated to Road Type

Another embodiment of the present invention relates to a method and a related device for more accurately detecting the presence of rumble strips contacting the tire of a vehicle. According to this embodiment of the invention, the type of road that the vehicle is driving on is identified or otherwise determined so that the rumble strips may be detected more accurately, and thus reduce "false alarm" rates of rumble strip detection. Input from a rumble strip is different depending on whether the rumble strip is on a concrete or asphalt road. On concrete roads, input from rumble strips is small. On the other hand, on asphalt roads, input from rumble strips is larger than that of concrete roads. However, the input from a concrete road without rumble strips tends to be much larger than the input from an asphalt road without rumble strips. This means that the change in input upon encountering a rumble strip on an asphalt road is much larger than the change in input when encountering a rumble strip on concrete. This phenomenon is illustrated in FIG. 6.

An embodiment of the present invention takes advantage of the above-discussed phenomenon by utilizing a variable threshold input above which it will be determined that the vehicle is contacting a rumble strip. The threshold input, which must be reached before rumble strip contact will be determined, when running on an asphalt road, will be set larger than the threshold input set when the vehicle is running on a concrete road, as shown in FIG. 6. When a rumble strip sensor senses an increase in input, if the increase in input does not rise above the threshold level set for that particular type of road, the rumble strip sensor will consider the input not to be indicative of contact with a rumble strip. Conversely, if the input sensed by rumble strip sensor is higher than the threshold level for a particular type of road, the rumble strip sensor will consider the input indicative of vehicle contact with a rumble strip.

Accordingly, an embodiment of the present invention includes a device that is adapted to detect a rumble strip that comes into contact with a tire of the vehicle, the device comprising a road sensor that is adapted to sense vibrational input (or other types of input) from a road surface into a tire of an automobile, and output a signal indicative of the level of input from the road surface into the tire. The device further includes a processor which is adapted to receive the signal from the sensor to determine whether the input from the road surface into the tire is indicative of input from an asphalt road or a concrete road. This processor further includes logic to determine whether input from the road surface is also indicative of input from a rumble strip either at the same time or using information from signals received at different times. This logic can rely on a first level of input from the road surface during a first time period and a second level of input from the road surface during the second time period after the first time period. The processor can be adapted to determine the difference between the second level of input and the first level of input. The processor can also determine that the input from the road surface is indicative of the input from the rumble strip when the difference is greater than a variable predetermined difference, the variable predetermined difference being greater when the vehicle is driving on an asphalt road than when the vehicle is driving on a concrete road. This variable difference is the threshold levels discussed above for asphalt and for concrete.

A device according to the just described embodiment can use the same sensor to provide a signal to the processor so that the processor can determine the type of road that the vehicle is driving on, as well as to provide a signal so that the processor can determine whether or not the vehicle is encountering rumble strips. That is, in an exemplary embodiment, the same vibrational sensor may be used. However, other embodiments of the present invention may utilize a different sensor to determine the type of road on which the vehicle is driving. For example, a sonar sensor, a RADAR sensor, a wheel speed sensor, a visual sensor, etc., may be used to determine the type of road on which the vehicle is driving. Once a determination as to the type of road that the vehicle is driving on is made, it is possible, in some embodiments, to simply apply a "ceiling" for the received frequencies, above which if input is sensed, the processor will determine that the vehicle is contacting a rumble strip. That is, instead of the threshold value being added to the sensed input from the road prior to encountering rumble strips, a value is utilized based on empirical analysis of road vibrations above which input will be considered as indicative of contact with a rumble strip.

Another embodiment of the present invention includes a device adapted to detect a road departure warning installation installed on a road that comes into contact with a tire of a vehicle comprising a road sensor adapted to sense vibrational input from a road surface into a tire of an automobile and output a signal containing data indicative of the level of input from the road surface into the tire. The device further includes a processor adapted to receive the signal from the sensor and determine whether the input from the road surface into the tire is indicative of input from an asphalt road or a concrete road by comparing the data in the signal to data stored in a look-up table indicative of the level of input from an asphalt road surface into the tire sensed by the road sensor and data stored in the look-up table indicative of the level of input from a concrete road surface into the tire.

In view of the above, yet another embodiment of the present invention includes a device having a sensor adapted to sense input from a road surface into a tire of an automobile and output a signal containing data indicative of the level of input from the road surface into the tire, and as well a processor that receives a second signal. The device further includes a road type sensor, which can be separate and different from the just described sensor, that senses the type of road that the vehicle is driving on and outputs the second signal containing data indicative of the type of road that the vehicle is driving on. The processor according to such a device receives both of the signals, and, utilizing the second signal, identifies the type of road and a threshold level of input that must be found in the data of the first signal before the processor will determine that the vehicle tires have come into contact with a rumble strip. This threshold value will be different depending on whether the road is concrete or whether the road is asphalt.

In other embodiments, a first command to the vehicle component control device can be to decrease a steering gear ratio of a steering gear ratio control system, and a second command to the vehicle component control device can be to increase a dampening factor of all of a vehicle's shock absorbers and maintain them increased for a substantial period of time. In other embodiments, the first command to the vehicle component control device can be to reduce the vehicle height by a predetermined amount, and the second command to the vehicle component control device can be to reduce the vehicle height so that the vehicle height is lower than the vehicle height resulting from the first command. The second command to the vehicle component control device can be to reduce the vehicle height so that the vehicle height is as low as possible. The processor can also override the issuance of the second command if the lateral speed of the vehicle with respect to the rumble strip is greater than a predetermined speed, and issuance of the first command to the vehicle component control device can be to reduce the vehicle height so that the vehicle height is as low as possible.

As discussed above, the embodiments of the present invention utilize devices and methods where the type of road that the vehicle is driving on is determined to set threshold levels for the detection of rumble strips. It is desirable therefore to be able to detect the type of road surface that the vehicle is driving on as accurately as possible. To this end, the present invention includes a device that is configured to enhance road type determination. An embodiment utilizing such a device to better detect a road surface may utilize band-pass filters to segregate out unneeded frequencies so that input frequencies of the road surfaces in the relevant frequency ranges are only outputted. Still further, it is noted that in such a device, the cutoff frequency of the band-pass filters can be changed in response to the type of road surface as well as the vehicle velocity, the latter being available since road surface input vibration frequencies change with varying vehicle speed. The conceptual function of such a device can be seen at FIG. 7.

Such a device may include a road sensor which is adapted to sense vibrational input from a road surface into a tire of an automobile and output a signal indicative of peak vibrational input from the road surface into the tire. The device may also include a processor that is adapted to receive the signal from the sensor and determine whether the peak input from the road surface into the tires is indicative of input from an asphalt road or a concrete road. The processor can include logic to determine whether the input from the road surface is also indicative of input from a rumble strip, the logic being based on a first level of input from the road surface during a first period of time and a second level of input from the road surface during the second time period after the first time period. The processor can be adapted to determine the difference between the second level of input and the first level of input, and to determine that the input from the road surface is indicative of input from a rumble strip if the difference is greater than a variable predetermined difference, the variable predetermined difference being greater when the vehicle is driving on an asphalt road than when the vehicle is driving on a concrete road. Such a device may instead or in addition to this, utilize a processor that is adapted to receive the signal from the sensor and determine whether the input from the road surface into the tire is indicative of input from an asphalt road or concrete road by comparing the data in the signal to data stored that is indicative of a level of input from an asphalt road surface into the tire sensed by the road sensor and data stored that is indicative of the level of input from a concrete road surface into the tire. The processor, is further adapted to determine whether the signal containing data indicative of the level of the input from a road surface into a tire contains data indicative of input from a rumble strip into the tire based on the difference between the levels of input into the tire sensed by the road sensor and at least one of a level of input sensed by the road sensor for an asphalt road stored in the lookup table and the level of input sensed by the road sensor for a concrete road that is also stored, in the lookup table. The processor is further adapted to determine that the signal contains data indicative of input from a rumble strip into the tire if the difference is greater than a predetermined difference, the predetermined difference being greater for asphalt roads than for concrete roads.

Figure 7:
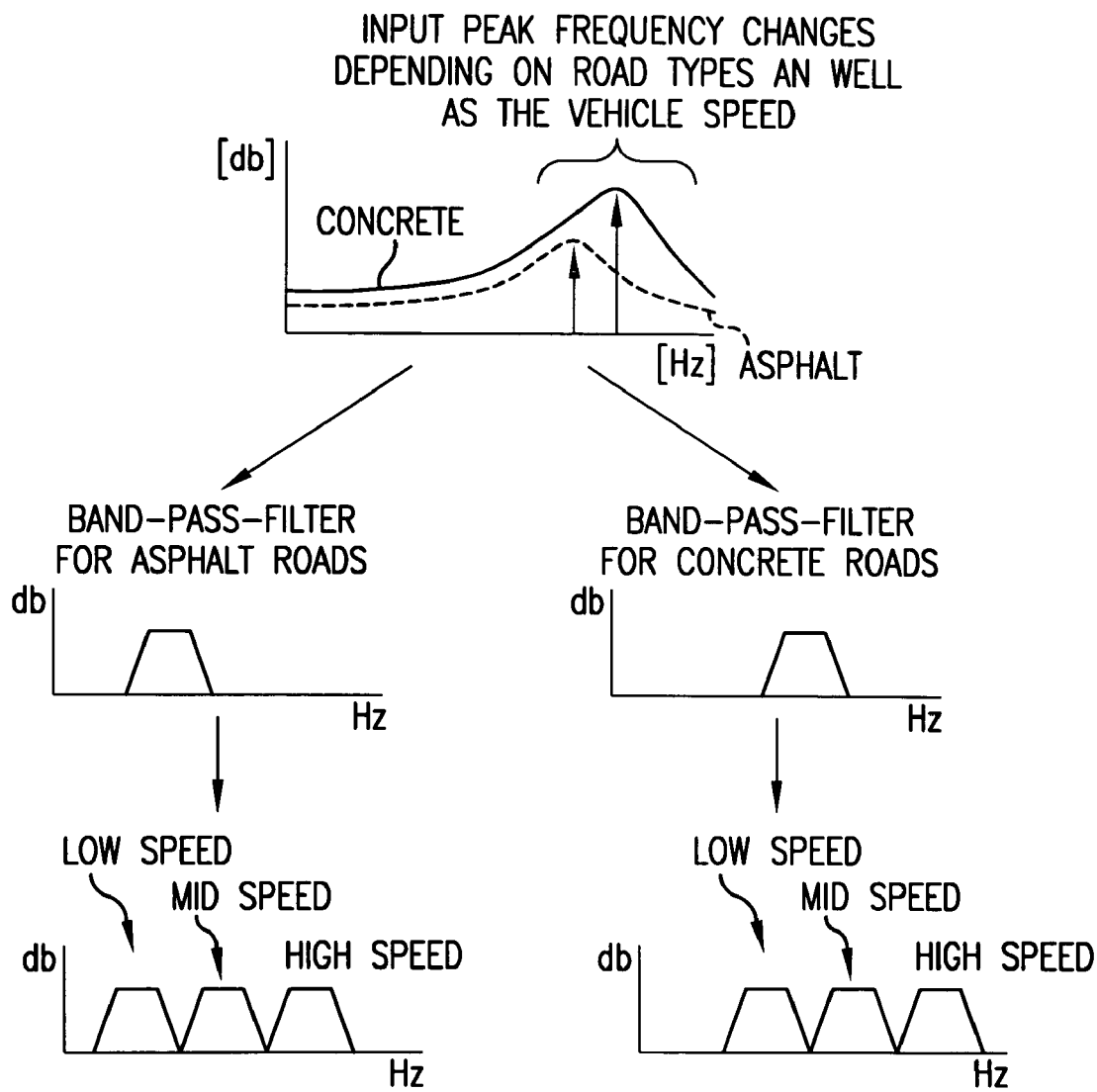
FIG. 7 depicts graphical representations of filtering out road input frequencies utilizing band-pass filters.

It is noted that other embodiments of the present invention can utilize devices of different configurations. Indeed, any device that can make use of the principles of band-pass filtering vibrational frequencies, as depicted in FIG. 7, may be used to improve road type sensing and/or rumble strip sensing, and thus can be utilized to practice the present invention.

Intermittent Rumble Strips and Road Deviation

Some of the devices and methods disclosed herein can be used in a system where the input from a rumble strip must be continuous for a predetermined period of time so that the chances of a false alarm are reduced. Still further, some embodiments of the present invention include systems that determine whether or not a driver is returning back onto the road by his or her own accord. That is, a drowsy driver may be waken by the devices disclosed herein, and thus take the appropriate corrective actions and drive off of the rumble strips back into the lane. Still further, some of the embodiments disclosed in the present invention utilize a control device to steer the vehicle away from the rumble strips. Thus, in these systems, once input from the rumble strip ceases, some systems are adapted to make the determination that the vehicle is no longer driving on the rumble strip. Devices having these features work well for continuous rumble strips. However, intermittent rumble strips (see FIG. 8) pose the possibility that such a device will be tricked into thinking that the vehicle is returning to the road when input from the intermittent rumble strip stops due to the rumble strips intermittency. This is seen more clearly by comparing contact with a continuous rumble strip (FIG. 9) and contact with an intermittent rumble strip (FIG. 10), as is done below.

FIG. 9 shows two rumble strip encounter scenarios on a continuous rumble strip. In the first scenario, the vehicle represented by the dashed curve contacts the rumble strip and then veers away from the rumble strip. In the second scenario represented by the solid curve, the vehicle encounters the rumble strip and continues to drive on the rumble strip. In embodiments of the present invention utilizing a processor to determine whether or not the vehicle is continuing to run on a rumble strip or whether or not the vehicle is taking corrective action based on the length of time that the vehicle is driving on the rumble strip based on a threshold time period (or threshold distance), the processor will determine that the vehicle continues to deviate from the lane in the second scenario, and determine that the vehicle has taken appropriate corrective action in the first scenario. This works well in the case of a continuous rumble strip.

However, in the case of an intermittent rumble strip, where the input from the rumble strip occurs for a short period of time, as seen in FIG. 10, the processor may think that the vehicle is returning to the road, when in fact the vehicle is continuing to depart from the road, and/or continuing to drive on a rumble strip because the period of time of rumble strip input is less than the threshold time (or threshold distance).

To address this problem, an embodiment of the present invention can utilize an algorithm that determines the time period between receiving input from intermittent rumble strips and determine whether or not the vehicle is departing from the road and/or continuing to contact rumble strips based on the time period between sensing input from rumble strips, as shown in FIG. 11. An embodiment of the present invention, therefore, includes a device comprising a processor that is adapted to receive a series of signals indicative of repetitive contact of a rumble strip with a tire of the vehicle as shown in FIGS. 10 and 11. The processor is adapted to determine the length of time between receipt of the signals and includes logic to determine that the vehicle is deviating from the road if the length of time between receipt of signals $T_{between}$ is less than a first predetermined time period and/or $T_{between}$ falls within a predetermined range of times. In the event that the processor does not receive a signal after the first signal within a certain period of time, or a range of time, the processor determines that the vehicle is returning to the lane. Thus, the device can determine whether or not the vehicle is deviating from the road if the series of signals arrive at the processor in a time period that is shorter than a predetermined time period, $T_{predetermined}$ (see FIG. 11). In yet another embodiment of the present invention, the processor is further adapted to determine the length of time that the signals are received and the processor includes logic to determine that the vehicle is contacting a rumble strip if the length of time that a first signal of the series of signals is received is longer than a second predetermined time period and to determine that the vehicle is deviating from the road if the length of time between the end of receipt of the first signal and a beginning of receipt of a second signal, $T_{between}$, of the series of signals is less than the first predetermined time period. That is, this device has a false alarm feature that lowers the number of false alarms by ensuring that a signal was received for at least a certain amount of time. It is noted that the first predetermined time and the second predetermined time can be the same or may be different.

Another embodiment of the present invention comprises a processor as just described that further includes logic to determine that the vehicle is deviating from the road if the length of time between the end of receipt of the first signal and the beginning of receipt of the second signal of the series of signals following the first signal is less than the first time period and the length of time that the second signal was received is longer than the second predetermined time period. That is, a device according to this embodiment also analyzes the length of time that a second signal following the first signal is received, thus further reducing the chance of a false alarm. Still further, another embodiment of the invention includes a processor that is adapted to receive an intervening signal between the just mentioned first signal and second signal in the series of signals, where the length of time that the intervening signal is received is shorter than the second predetermined time period. This embodiment addresses the possibility that a false signal might be received in between two valid signals indicative of contact with rumble strips. Thus, the device includes logic to ignore this false signal but still "look" for receipt of the second signal, and if the second signal begins within the predetermined time period following the end of receipt of the first signal, and also persists for a sufficient period of time to be indicative of a rumble strip, the device then determines that the vehicle is continuing to contact rumble strips.

Another embodiment of the present invention includes any of the processors just described wherein the processor further includes logic to determine whether the vehicle is continuing to depart from the road or whether the vehicle is returning to the road.

Devices as just described also may include a processor having logic to initiate a warning to a driver of the vehicle once the processor has determined that the vehicle is continuing to depart from the road and/or continuing to contact rumble strips. Still further, a processor utilized in the embodiments just described may also be adapted to issue a vehicle control command once the processor has determined the vehicle was continuing to depart from the road or continuing to contact rumble strips. Such a device may also include a vehicle control unit in communication with a processor which is adapted to receive the vehicle control command from the processor and automatically steer the vehicle back onto the road and/or automatically brake the vehicle once the processor has determined that the vehicle is continuing to depart from the road and/or contact rumble strips. Still further, another embodiment of the present invention includes the processor described above, further including logic to determine that the vehicle is contacting a rumble strip if the length of time that a signal, for example, the first signal, is received is longer than a second predetermined time period. That is, the above described device to determine whether the vehicle has returned to a road or is continuing to depart from the road accounting for intermittent rumble strips can also be configured to be utilized for continuous rumble strips. That is, the determination that the vehicle is continuing to depart from the road is not dependent on the receipt of a second signal; it can be determined based only on the first signal if that signal persists for long enough.

Disregarding Rumble Strip Detection

Figure 12:
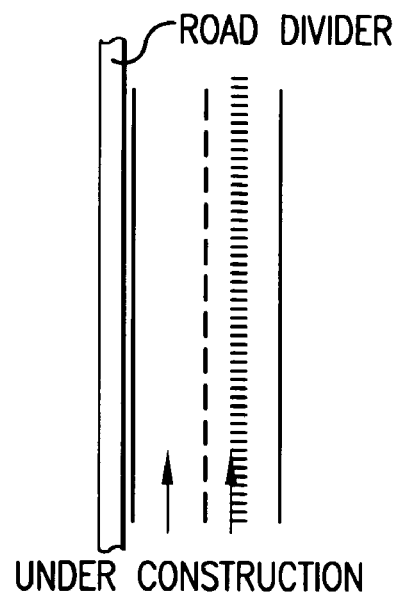
FIG. 12 depicts a divided road under construction.

Another aspect of the present invention is directed towards determining whether a rumble strip detection system should ignore input from a rumble strip. Such a device can be used when driving on roads that are under construction. In some instances, roads that are under construction have their lanes shifted, for example, to a shoulder of a road such that the shoulder may become a temporary lane while another portion of the road is under construction, thus permitting vehicles to continue using a road. When properly driving on such a road, a vehicle may come into contact with these rumble strips. FIG. 12 shows a road under construction, where the rumble strips lie substantially in the middle of a lane. When driving on such a road, the vehicle may come into contact with the rumble strips even though the vehicle is being driven properly.

To accomplish such a goal, an embodiment of the present invention includes a device that is adapted to determine whether vehicle contact with a road departure warning installation, such as a rumble strip, installed on a road should be ignored. The device relies on information relating to whether or not a road is a divided road and the location of the rumble strip on the road to make this determination, as will now be explained.

The device comprises a processor which is adapted to receive a signal indicative of contact of a rumble strip with the tire of the vehicle and to analyze the received signal and determine that the rumble strip has contacted the tire. The processor is also configured to receive input relating to the location of the rumble strip with respect to plurality a of driving lanes. That is, the processor can receive input from for example a RADAR system, a visual detector, or another type of sensor, that can determine whether or not the rumble strips are located within driving lanes, such as the rumble strips shown in FIG. 12. The processor is further adapted to receive input that the vehicle is driving one of an undivided road such as the road shown in FIG. 13. Such input could come from, for example a GPS system in combination with a map data base of local roads and/or from information from roadside by Detailed Short Range Communication, or by RADAR sensors or vision sensors that may detect a median wall or road divider, such as that shown in FIG. 12, the absence of such a median wall or road divider being indicative of an undivided road.

The processor according to this device further includes logic to issue at least one of a warning command and/or a vehicle control command when it is determined that the rumble strip is located within driving lanes and that the vehicle is driving on an undivided road. That is, when the device senses that rumble strips are located within driving lanes and on a road that is an undivided road, the device assumes that the vehicle is deviating into a center rumble strip on an undivided road separating the driving lane from the oncoming lane, and thus issues a warning and/or a vehicle control command so that the vehicle may take corrective action.

Road Separator Rumble Strips and Shoulder Rumble Strips

Figure 13:
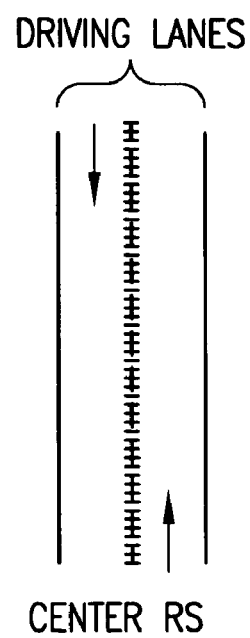
FIG. 13 depicts a rumble strip separating oncoming lanes.

Another embodiment of the present invention is directed towards discrimination between center rumble strips and shoulder rumble strips. FIG. 13 shows center rumble strips separating oncoming lanes. This is contrasted to shoulder rumble strips which lie along the edges of lanes. In many instances, vehicle deviation into an oncoming lane will have more serious consequences than deviation from a lane onto a shoulder of a road. Thus, an embodiment of the present invention includes a device that is adapted to detect whether or not a vehicle is contacting center rumble strips or shoulder rumble strips, and thus to determine whether or not the vehicle is deviating into an oncoming lane or onto a shoulder. Such a device may issue a warning that alerts the driver more aggressively when the driver is deviating into an opposite lane and/or takes control of the vehicle and issues a control command to control the vehicle in a more aggressive manner. In some embodiments of the invention, such a device includes a processor that is configured to distinguish center rumble strips from shoulder rumble strips based on the pattern or the type of rumble strips. That is, because roads sometimes utilize different types of rumble strips or different rumble strip patterns for center rumble strips, a device can be implemented into a vehicle that can distinguish a center rumble strip pattern from a shoulder rumble strip pattern based on, for example, input frequency from the rumble strips, and thus recognize if the vehicle is about to deviate from a road onto a shoulder or into an opposite traffic lane, the latter typically resulting in more severe consequences. Based on this determination, the device can issue an appropriate warning and/or take control of the vehicle as necessary.

Lane Marker Distance from Rumble Strips

Figure 14:
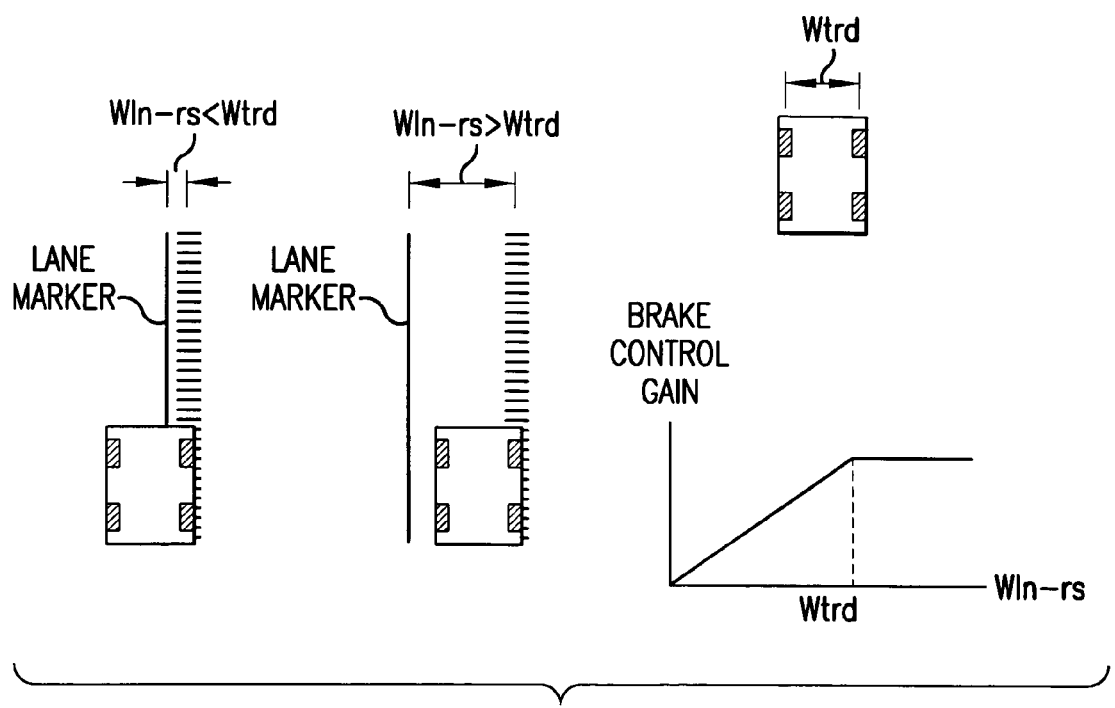
FIG. 14 depicts control of a vehicle component in relation to the distance from a lane marker to a detected rumble strip.

Another embodiment of the invention takes advantage of the fact that rumble strips on the sides of roads sometimes have varying distances from a lane marker, such as can be seen in FIG. 14. By determining the distance $Wln-rs$ between a lane marker and a rumble strip, an embodiment of the present invention can determine the severity of a vehicle deviation, from a lane or road. Still further, by utilizing this distance information to judge the severity of the vehicle deviation, the present invention can include determination of the type of control that should be provided to a vehicle and/or the type of warning provided. For example, if the distance between the lane marker and the rumble strips is small, for example less than the tread width, the device may simply output a minor advisory to the driver to be more attentive, whereas, if the distance between the lane marker and the rumble strips is large, for example, greater than the tread width, the device may output a warning forcefully commanding the driver to steer to the left. Still further, if the distance between the lane marker and the rumble strips is small, a control command outputted by the processor may be minor, as opposed to when the distance is very large, the amount of control exerted on the vehicle being greater. An example of this variable control can be seen in the graph on FIG. 14, which shows that brake control gain increases as the detected distance between the lane marker and the rumble strip increases. Still further by way of example, as can again be seen in the graph in FIG. 14, after a certain distance of lane-rumble strip separation, the brake control grain stays the same; this distance could be a distance equal to and/or greater than the tread width of the vehicle. Such a control regime is also applicable to vehicle steering commands and/or any other command that can be used with the present invention.

An example of this embodiment of the invention includes a device that is adapted to determine the distance between a lane marker and a rumble strip. The device comprises a processor which is adapted to receive a first signal that is indicative of the crossing of a lane marker such as a painted line, by the vehicle and to receive a second signal indicative of a lateral speed of the vehicle, and further to receive a third signal indicative of contact of a rumble strip with the tire of the vehicle. The processor is further adapted to analyze this third signal and determine that the rumble strip has indeed contacted the tire and also to determine the time period between receiving the first signal and receiving the third signal. Further, the processor is adapted to determine the distance between the lane marker and the rumble strip based on the time period between receiving the first signal and receiving the third signal as well as on the lateral speed of the vehicle. The distance between the lane marker on the rumble strip may be determined based on the equation:

$$Wln-rs = Vltrl \cdot \Delta tln-rs$$

where, $Vltrl$=lateral speed of the vehicle, and $\Delta tln-rs$=time between crossing the lane marker and detecting the rumble strip.

Such a device can also include a sensor that is adapted to detect the lane marker as well as to determine that the vehicle has crossed the lane marker. Such a device can further include a visual sensor, a magnetic sensor or any sensor that will permit identification of the presence of a lane marker and/or that the vehicle has crossed the lane marker.

While in the just described embodiment, the vehicle's lateral speed is used to determine the distance from the lane marker and/or the distance between the lane marker and the rumble strip, other embodiments can utilize actual measurements of the distance between the lane marker and the rumble strip. Such a device may include a visual sensor and/or a laser sensor that utilizes, for example, triangulation to determine the distance from a location on the vehicle and the lane marker. Once contact with the rumble strip is made with the vehicle's tires, if the distance between the location on the vehicle and the tire is known, the distance between the rumble strip and the lane marker can also be determined.

As noted above, it is anticipated that once contact with a rumble strip sensor is detected, a corrective action will be made which may include steering and/or braking. Alternatively, if corrective action is not taken, the vehicle may likely to leave the road and/or get into some form of accident after contact with rumble strips is detected.

Specific Implementation of the Invention

Figure 15:
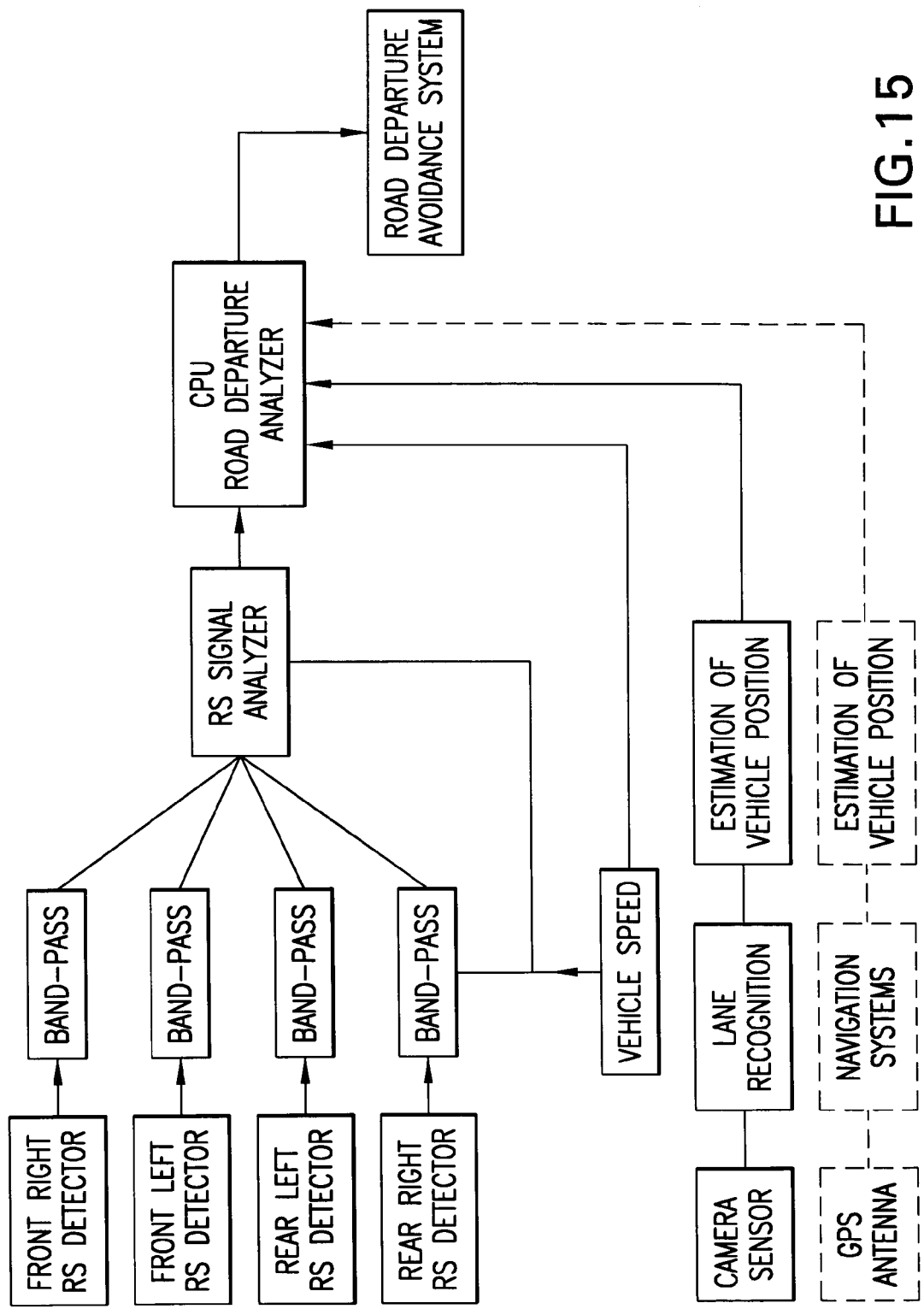
FIG. 15 provides a block diagram of a device adapted to implement an embodiment according to the present invention.

FIGS. 15–25 illustrate specific implementations of the invention. One of skill in the art will understand that these figures provided some examples of the techniques described in detail above. Because such techniques have been described in detail above and/or may readily be implemented by one of ordinary skill in the art based on the figures in combination with the teachings and knowledge in the art, a detailed description of these figures is not provided. FIG. 15 presents a block diagram of a device adapted to implement an embodiment of the present invention. It is noted that some embodiments can include additional features, while other embodiments need not utilize each feature presented. For example, some embodiments can be practiced without GPS.

It is further noted that when referring to "logic" herein, "logic" is used broadly. For example, logic includes hardware, software, firmware, etc. Simple and/or complex circuits can be utilized to implement logic according to the present invention.

Many of the above devices and/or methods may utilize piezoelectric devices to determine the state of various components described herein. For example, a piezoelectric device may be utilized to determine the state of pressure in a shock absorber.

It is further noted that when referring to devices such as processors and sensors, such devices are referred to both as a single unit and as separate units. That is, a processor that receives a signal from a sensor could include a sensor, and visa versa.

Figure 16:
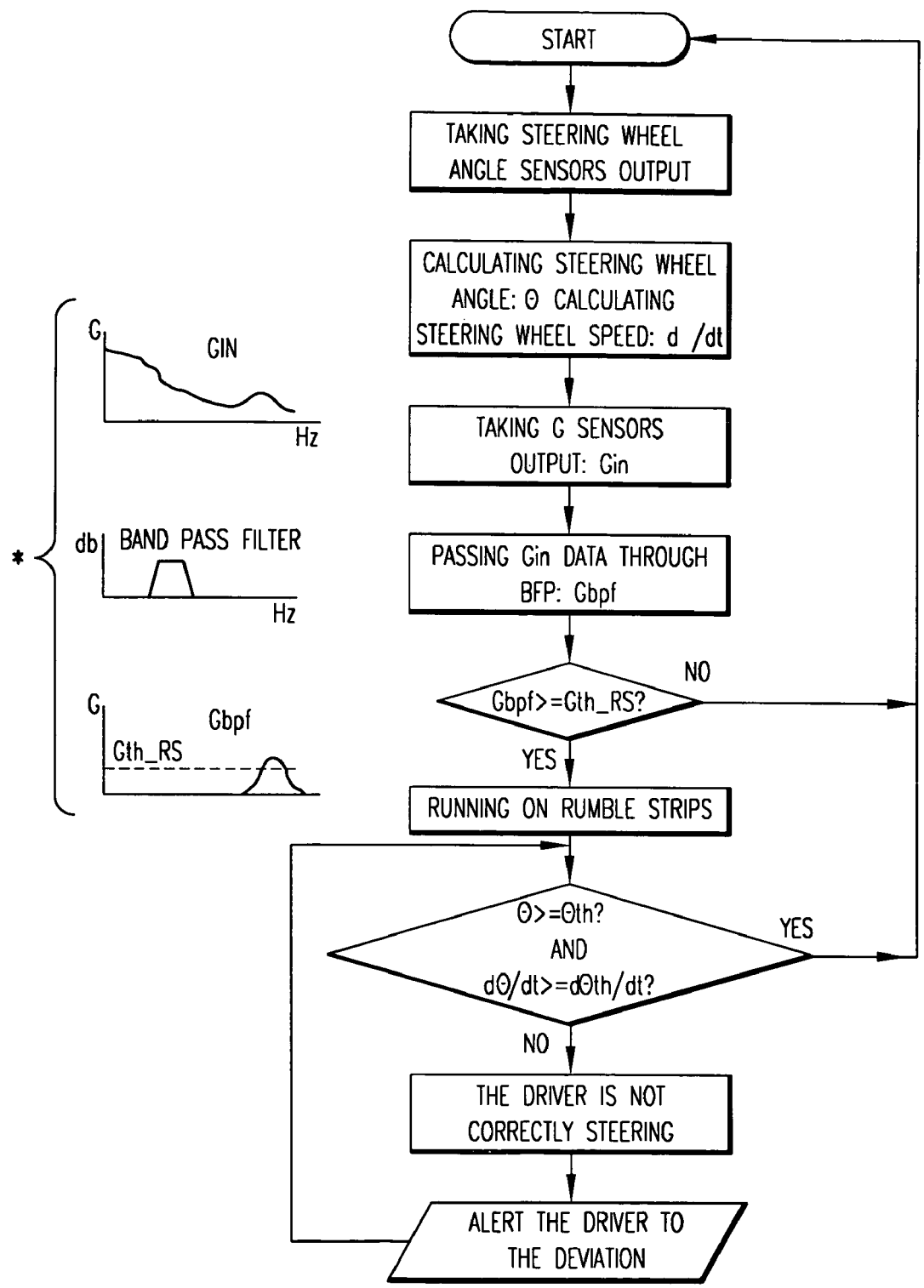
FIG. 16 is a flow chart for an algorithm to implement an embodiment of the present invention relating to determining whether or not a driver is taking corrective action in response to running on rumble strips.

The present invention also includes software and firmware for implementing the above and below described embodiments of the invention. In this regard, algorithms according to the present invention will now be described; algorithms which can form the basis for control programs and routines for implementing aspects of the invention. FIG. 16 shows a flow chart for an algorithm that utilizes the steering wheel angle and the rate of change of the steering wheel angle to determine whether or not the driver is taking corrective action (corrective steering) based on whether the angle that the steering wheel is turned is greater than or equal to a threshold angle, $\theta th$, and whether the rate of change of the steering wheel angle is greater or equal to a threshold rate of change.

In the embodiments described in the flow chart in FIG. 16 as well as the following flow charts, a gravity sensor, (G sensor) is utilized as the rumble strip sensor. However other sensors can be used in place of a G senor or in addition to a G sensor to practice the invention.

Figure 17:
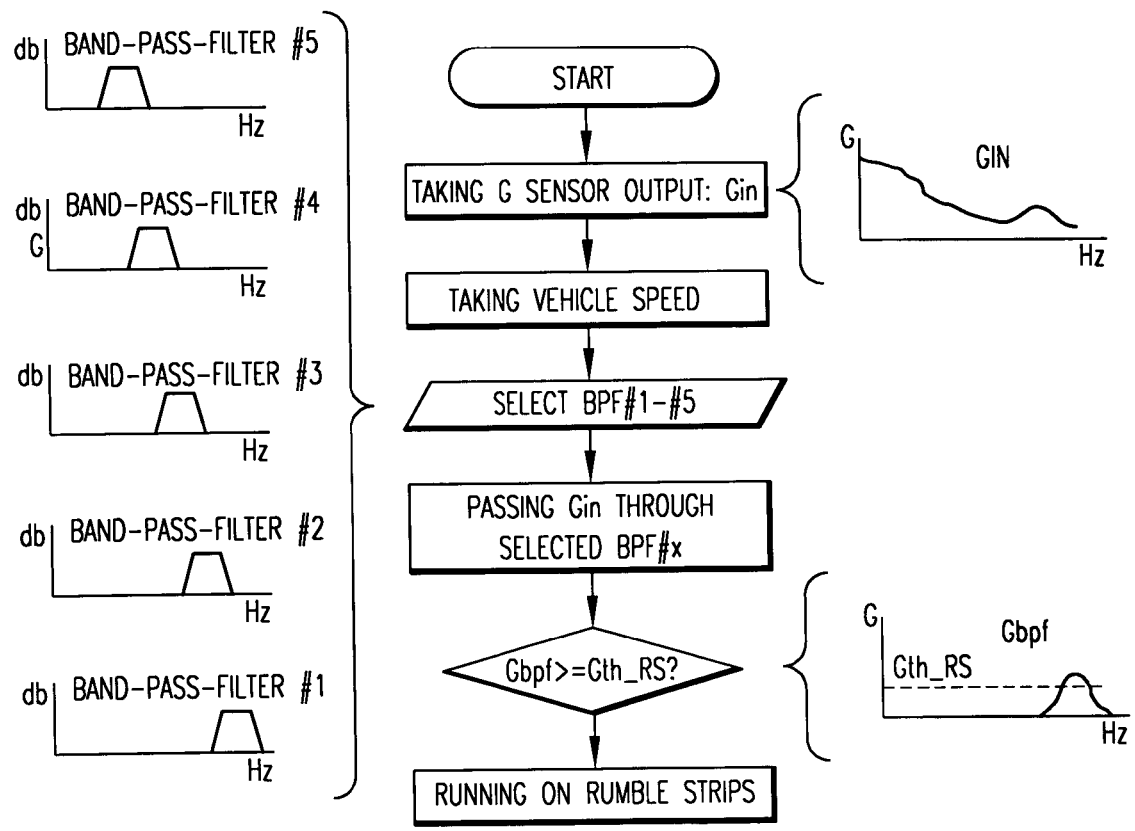
FIG. 17 is a flow chart for an algorithm to detect rumble strips.

FIG. 17 provides a flow chart for an algorithm to detect rumble strips contacting a tire of the vehicle. In the flow chart of FIG. 17, various exemplary band-pass filters are utilized to filter out various frequencies in accordance with the embodiments of the invention utilizing frequency filtering as described above.

Figure 18:
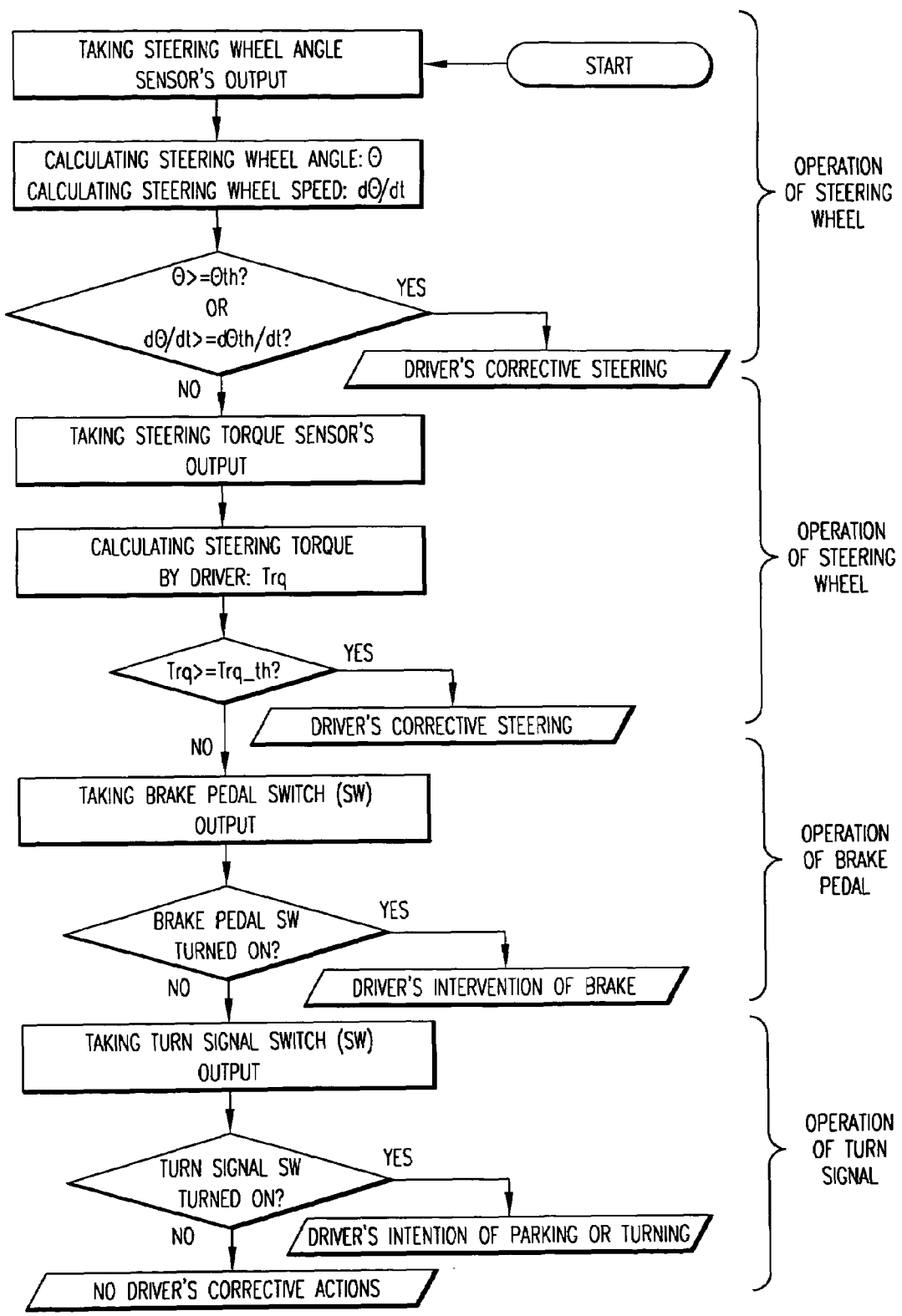
FIG. 18 is a flow chart for an algorithm to detect a driver's corrective action according to an embodiment of the invention.

FIG. 18 provides a flow chart for an algorithm to determine whether or not a driver is taking corrective action according to the present invention.

Figure 19:
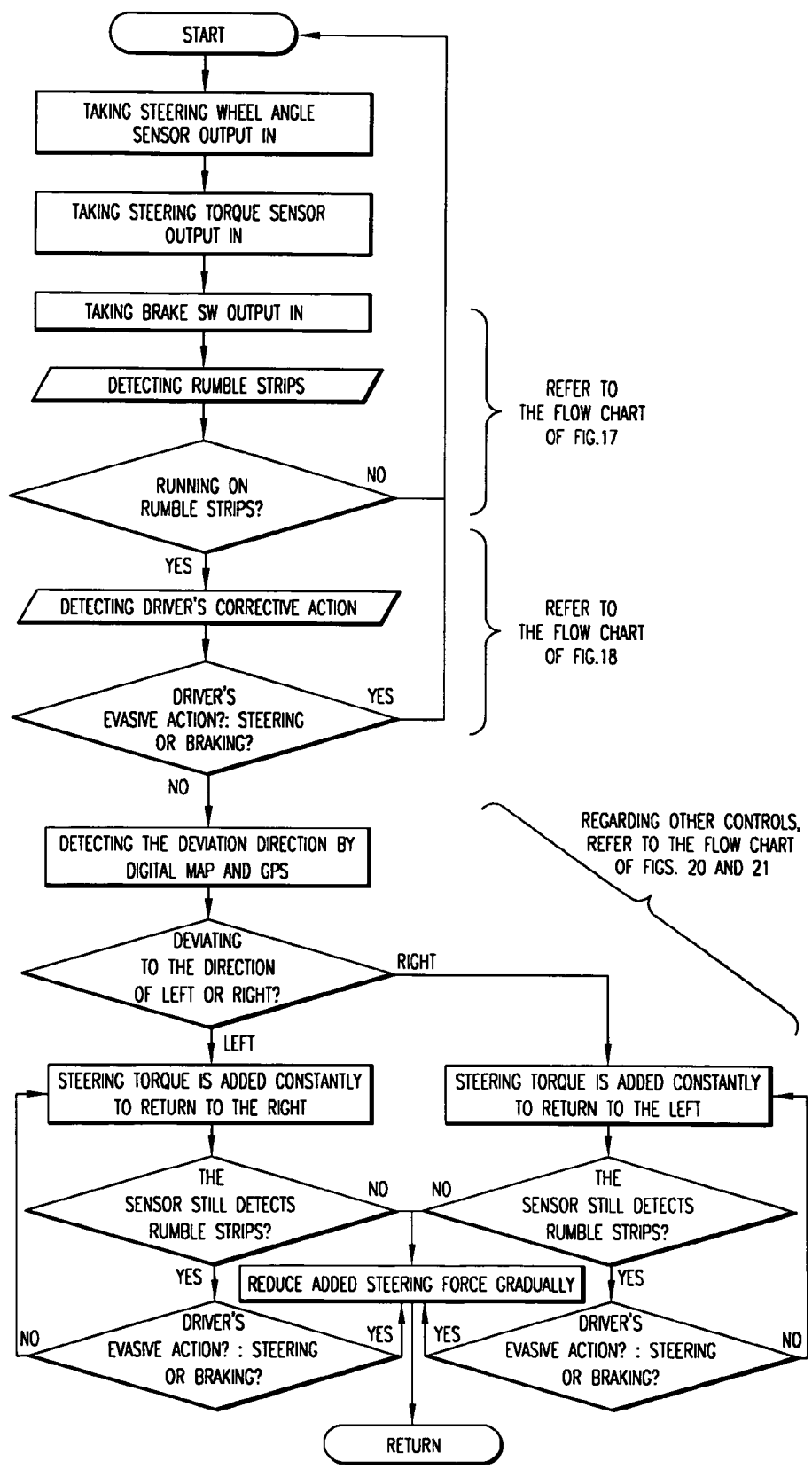
FIG. 19 is a flow chart for an algorithm to implement another embodiment of the present invention relating to road departure avoidance utilizing steering commands.
Figure 20:
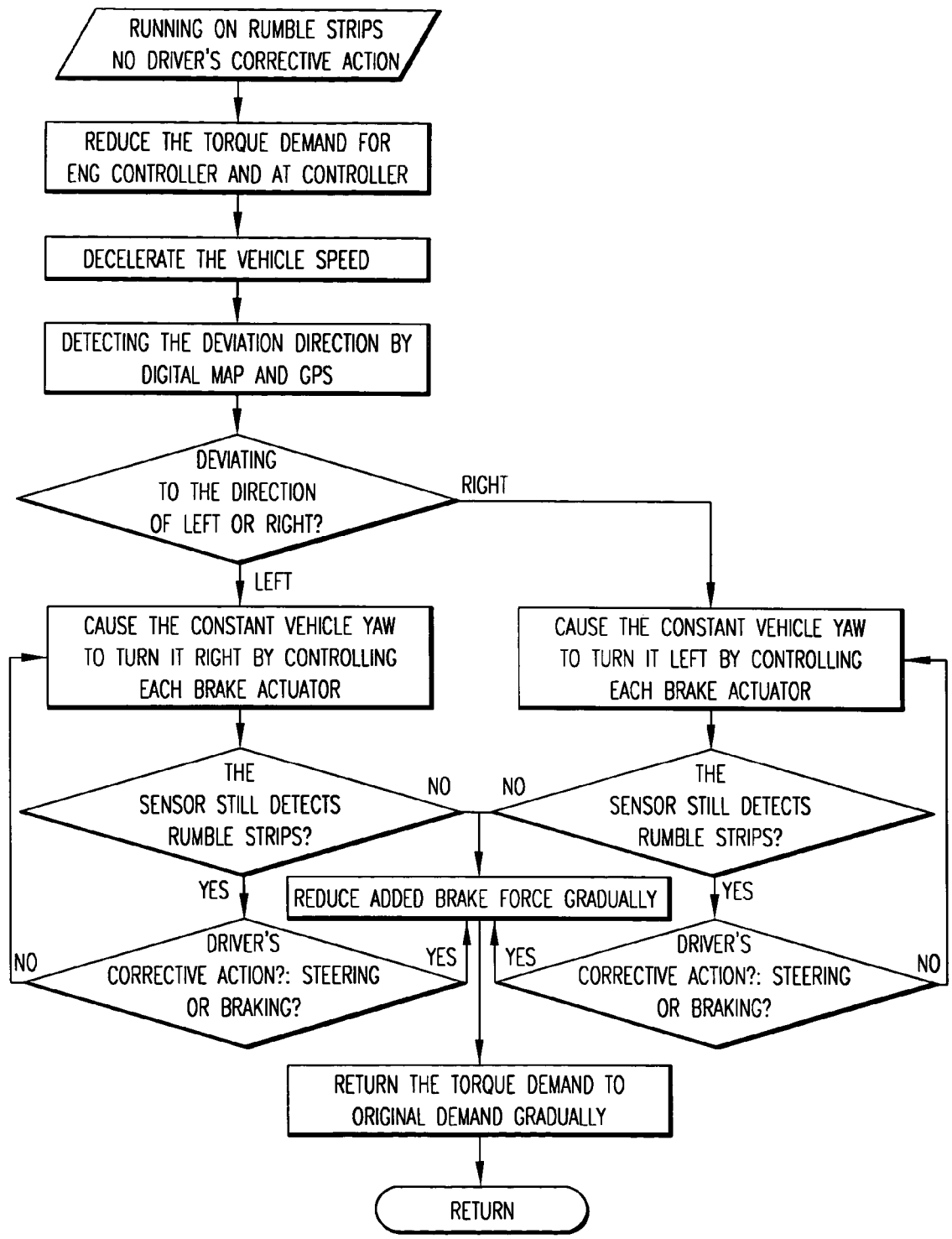
FIG. 20 is a flow chart for an algorithm to implement brake control according to the present invention.
Figure 21:
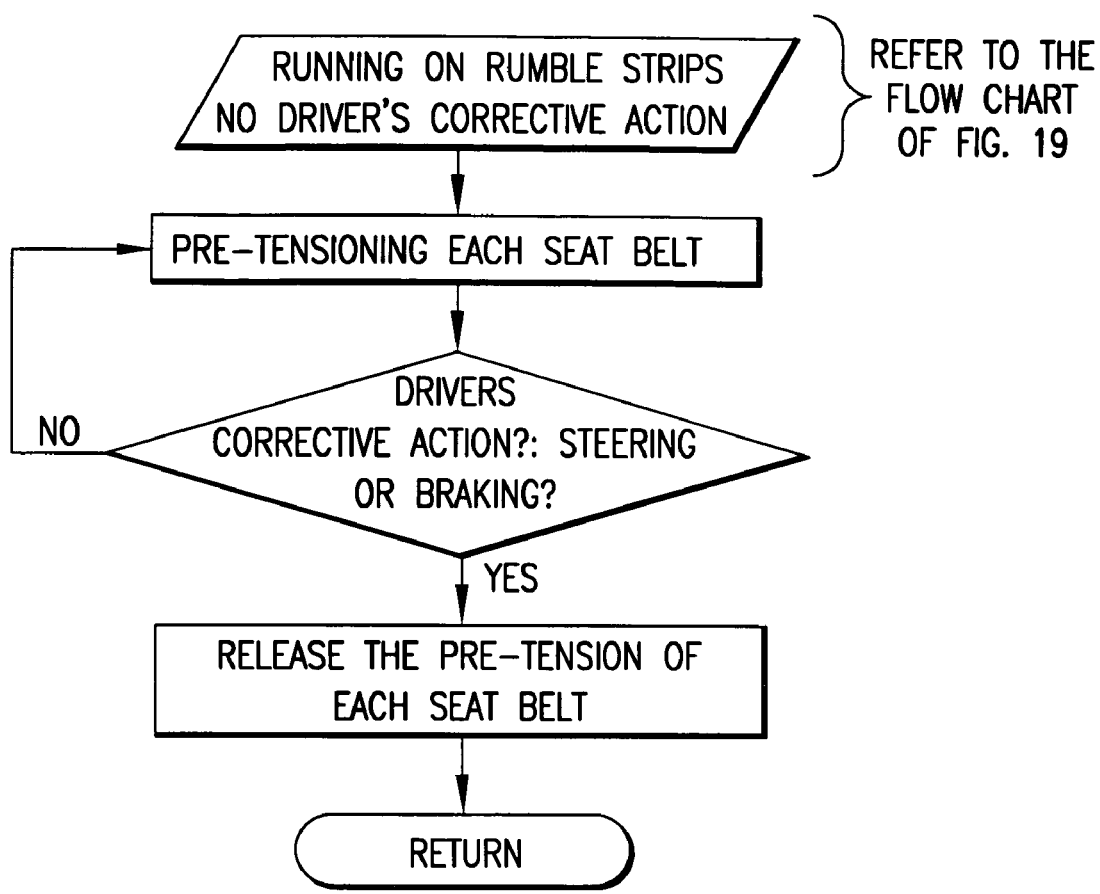
FIG. 21 is a flow chart for an algorithm to implement pretensioning of seat belts in response to the detection of rumble strips according to the present invention.

FIG. 19 provides a flow chart for an algorithm to implement road deviation/departure avoidance with steering and/or brake control according to the present invention. As can be seen, the flow chart of FIG. 19 refers to the flow charts of FIGS. 17 and 18 for the detection of rumble strips and the determination that the driver is steering correctively. Still further, the flow chart of FIG. 19 refers to the flow charts of FIGS. 20 and 21 showing flow charts for algorithms for brake and control algorithms for the control of the pre-tensioning of seat belts according to the present invention, respectively.

Figure 22:
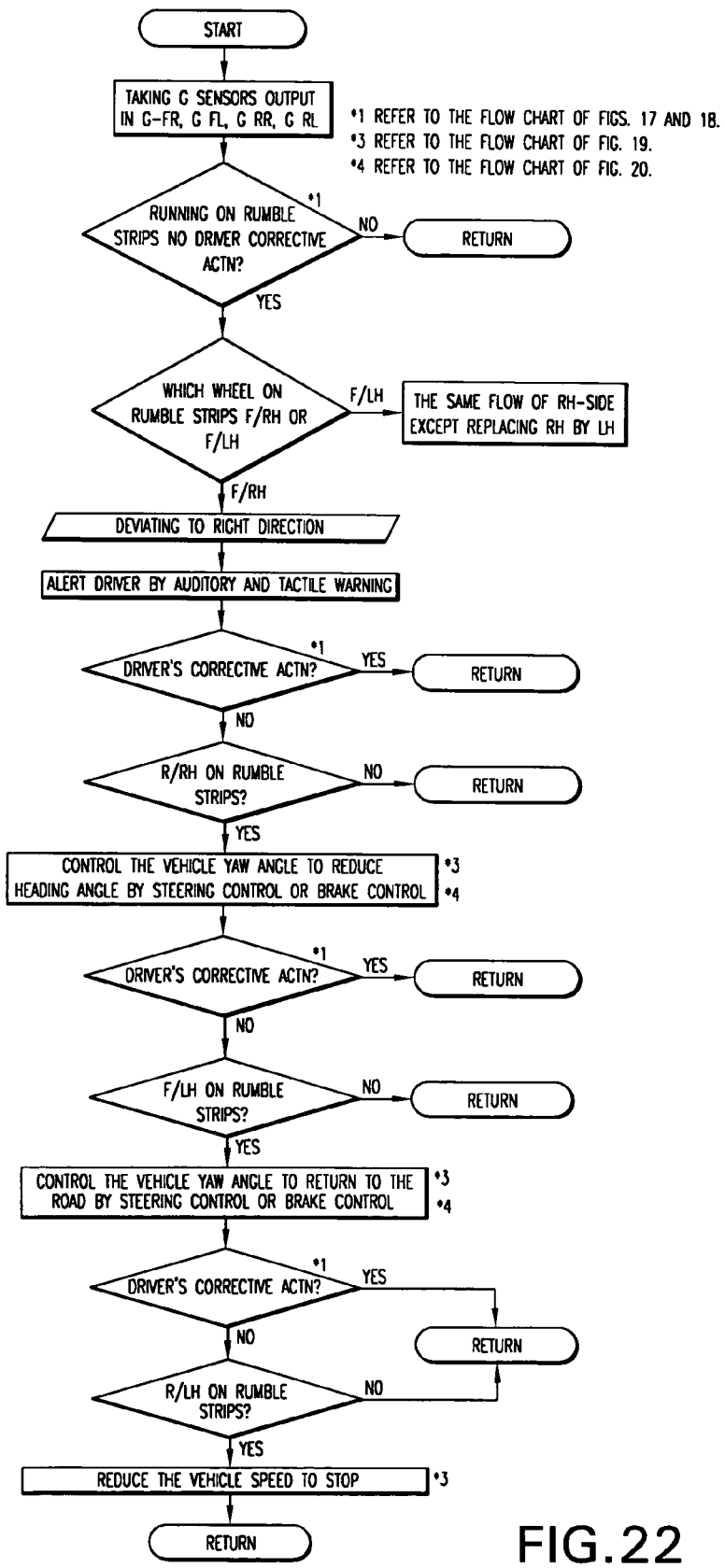
FIG. 22 is a flow chart for an algorithm to implement vehicle control in response to the lateral displacement of the vehicle.

The flow chart shown in FIG. 22 provides a flow chart for an algorithm for vehicle control based on the lateral displacement of the vehicle with respect to rumble strips. It can be seen that the flow chart of FIG. 22 refers to the flow charts of FIGS. 17, 18, 19 and 20 for the detection of the drivers' corrective action and the pre-tensioning of drivers seat belts.

Figure 23:
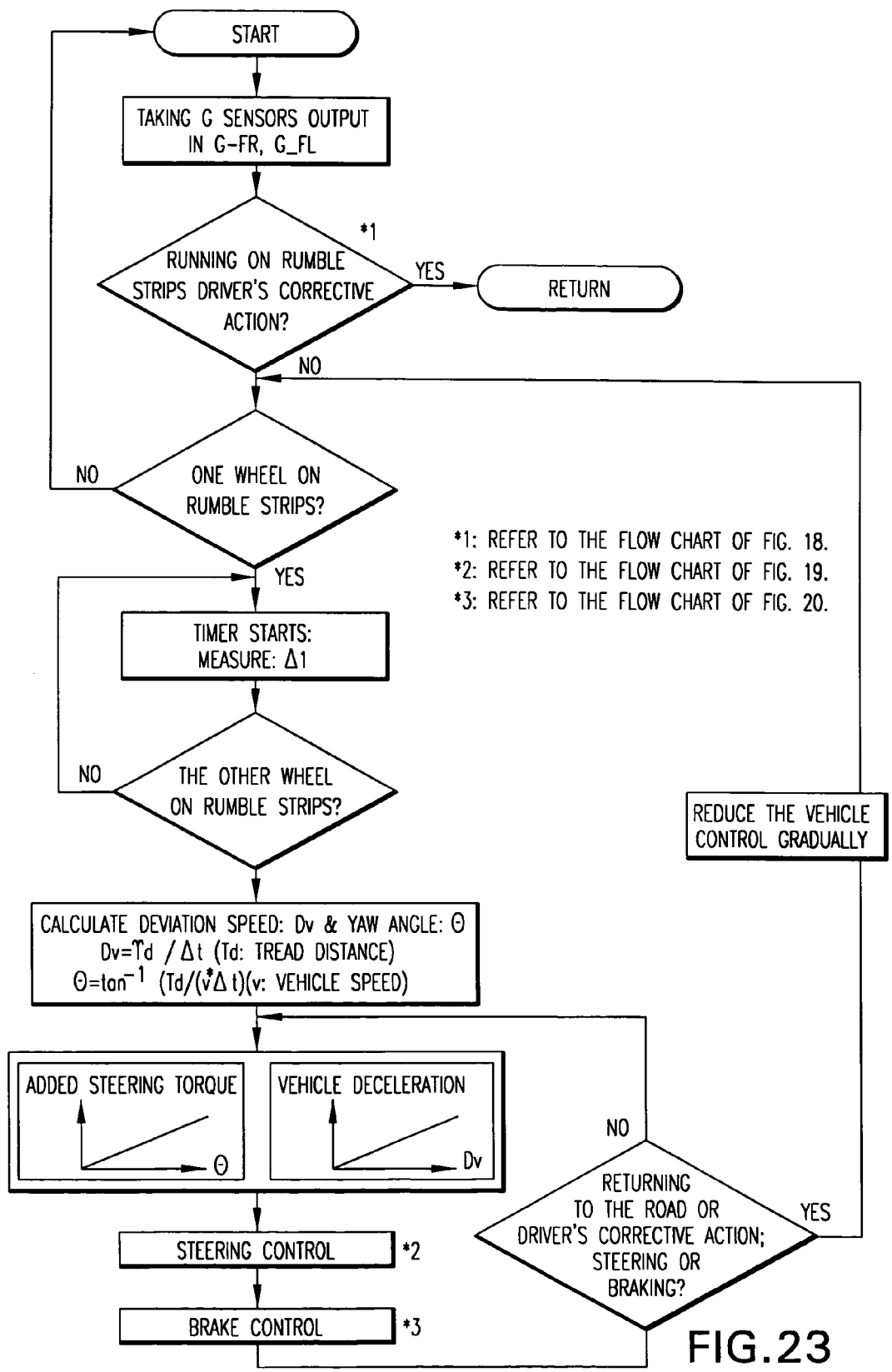
FIG. 23 is a flow chart for an algorithm to estimate lateral speed and angle of deviation with respect to rumble strips according to the present invention.

FIG. 23 presents a flow chart for an algorithm to estimate or otherwise determine the lateral speed and the angle of deviation with respect to the rumble strips of a vehicle after crossing rumble strips. The flow chart of FIG. 23 refers to the flow charts of FIGS. 18 and 20.

Figure 24:
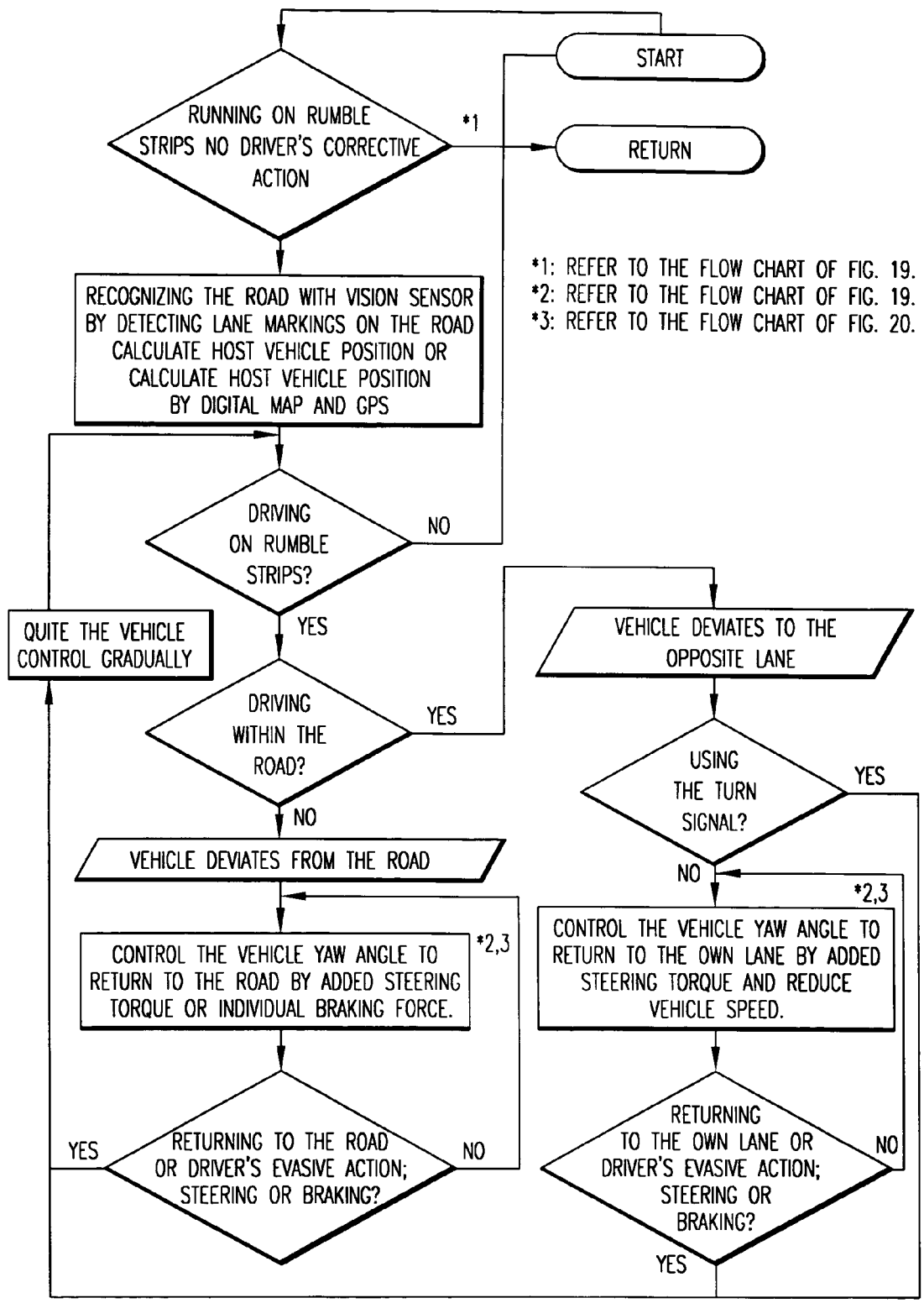
FIG. 24 is a flow chart for an algorithm to determine vehicle deviation into an oncoming lane according to the present invention.

FIG. 24 provides a flow chart for an algorithm to determine whether or not a vehicle is deviating into an opposite or oncoming lane. As with the flow chart of FIG. 23, the flow chart of FIG. 24 refers to flow charts of FIGS. 18, 19 and FIG. 20.

Figure 25:
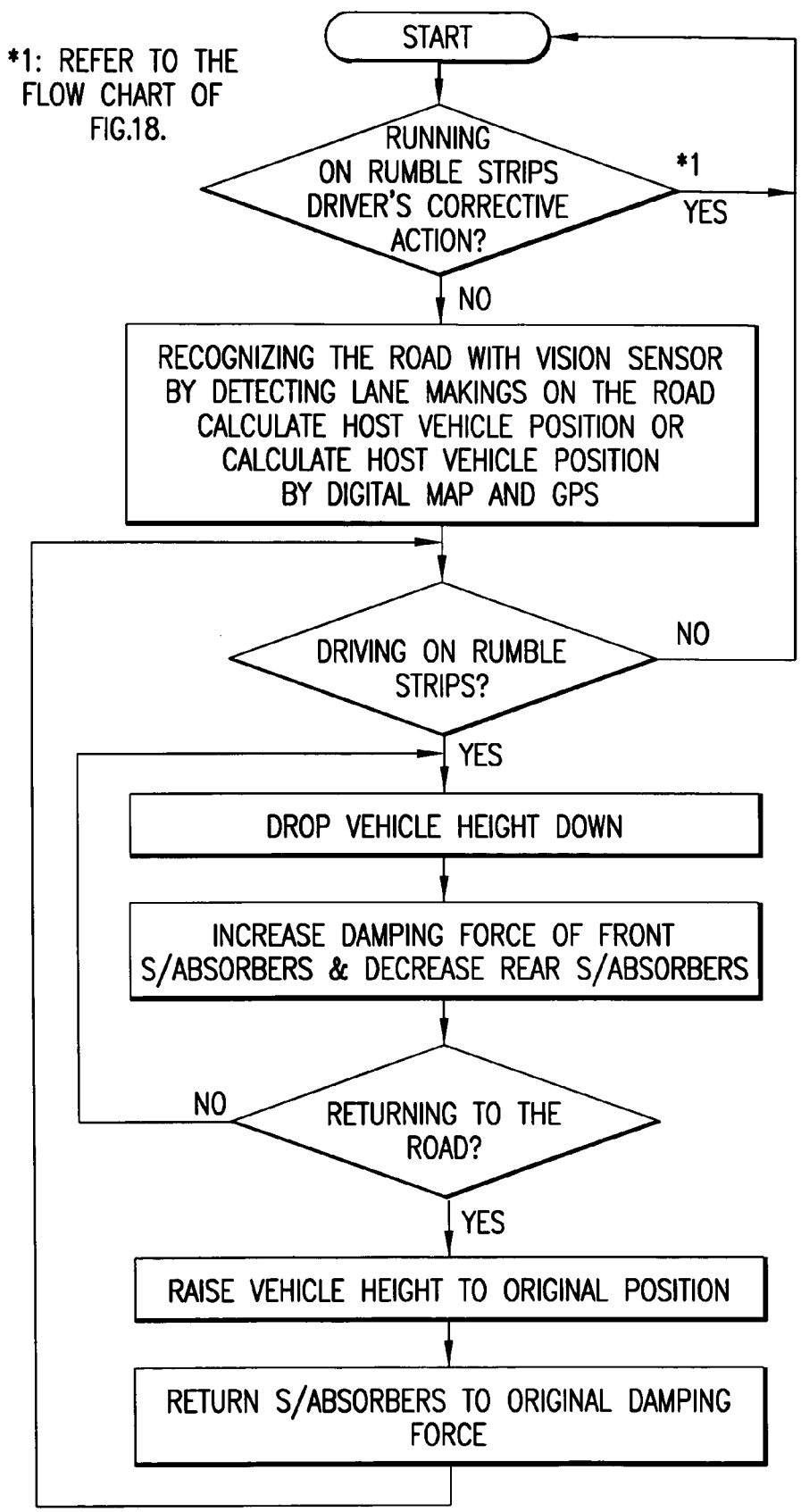
FIG. 25 is a flow chart for an algorithm to increase vehicle stability after detecting rumble strips according to the present invention.

FIG. 25 presents a flow chart for an algorithm that can be utilized to implement vehicle stability control upon the determination that the vehicle has crossed rumble strips and/or is deviating from a lane or off the road. The flow chart of FIG. 25 refers to the flow chart of FIG. 19.

Accordingly, the present invention includes a program product and hardware for implementing the above algorithms, as well as the systems and methods described herein, and also for the control of the devices described herein.

Given the disclosure of the present invention, one versed in the art would appreciate that there may be other embodiments and modifications within the scope and spirit of the present invention. Accordingly, all modifications within the scope and spirit of the present invention are to be included as further embodiments of the present invention. The scope of the present invention accordingly is to be defined as set forth in the appended claims.

What is claimed is:

1. A device adapted to transfer characteristics of a road departure warning installation installed on a road to a driver of a vehicle, comprising:
    a rumble strip sensor adapted to sense input from a rumble strip; and
    an adjustable vehicle suspension system in communication with the rumble strip sensor, the adjustable vehicle suspension system being adapted to automatically adjust in response to input into the rumble strip sensor from a rumble strip.

2. The device of claim 1, wherein automatic adjustment of the vehicle suspension system includes adjustment to increase the amount of input from the rumble strip sensed by the driver.

3. The device of claim 2, wherein the adjustable vehicle suspension system includes a shock absorber, and wherein adjustment to increase the amount of input from the rumble strip sensed by the driver includes an adjustment of a damping factor of the shock absorber.

4. The device of claim 3, wherein adjustment of the damping factor of the shock absorber in the vehicle suspension includes adjustment of the damping factor to an input frequency of a plurality of rumble strips sensed by the rumble strip sensor.

5. The device of claim 2, wherein the adjustable vehicle suspension system includes a suspension spring, and wherein adjustment to increase the amount of input from the rumble strip sensed by the driver includes an adjustment of a spring constant of the spring.

6. A device adapted to make a driver of a vehicle aware of contact with a road departure warning installation installed on a road, comprising:
   a rumble strip sensor adapted to sense input from a rumble strip; and
   a vehicle component control device adapted to change a state of a vehicle component in communication with the vehicle component control device in response to input into the rumble strip sensor from a rumble strip, wherein the vehicle component is at least one of an automatically tightening driver's seat belt, a powered door window, and a powered door lock, wherein the component control device at least one of tightens the driver's seat belt, lowers or raises the powered door window and locks the powered door lock, respectively.

7. A device adapted to make a driver of a vehicle aware of contact with a road departure warning installation installed on a road, comprising:
   a rumble strip sensor adapted to sense input from a rumble strip; and
   a vehicle component control device adapted to chance a state of a vehicle component in communication with the vehicle component control device in response to input into the rumble strip sensor from a rumble strip, wherein the vehicle component is at least one of an aerosol dispenser with a nozzle mounted in the vehicle cabin, and wherein the component control device enables the aerosol dispenser to emit a fragrance.

8. The device according to claim 7, wherein the fragrance has a pungent smell known to heighten an awareness of a typical human being.

9. A device adapted to determine whether a vehicle is deviating into an oncoming lane of an un-divided highway, comprising:
   a processor adapted to receive at least a first signal indicative of contact of a rumble strip with a tire of the vehicle, wherein the processor includes logic to:
      determine whether or not the vehicle is deviating into an oncoming lane;
      initiate a first warning to a driver of the vehicle once the processor has received the first signal and has determined that the vehicle is not deviating into an oncoming lane; and
      initiate a second warning to a driver of the vehicle once the processor has received the first signal and has determined that the vehicle is deviating into an oncoming lane, wherein the first warning is different than the second warning.

10. The device according to claim 9, wherein the device further includes:
    a first warning device in communication with the processor, wherein the first warning device is adapted to issue the first warning to the driver; and
    a second warning device in communication with the processor, wherein the second warning device is adapted to issue the second warning to the driver that is different than the first warning.

11. The device according to claim 9, wherein the device further includes:
    a warning device in communication with the processor, wherein the warning device is adapted to issue the first warning to the driver and the second warning to the driver.

12. The device according to claim 11, wherein the first warning and the second warning comprise an audio message to the driver, the second warning being louder than the first warning.

13. The device according to claim 9, wherein the processor utilizes information based on GPS data to estimate whether or not the vehicle is deviating into an oncoming lane.

14. The device according to claim 9, wherein the first signal is also indicative of a type of rumble strip in contact with the tire, and wherein the processor includes logic to analyze the first signal and estimate whether or not the vehicle is deviating into an oncoming lane based on the type of rumble strip in contact with the tire.

15. The device according to claim 9, wherein the first signal is also indicative of a frequency of contact with rumble strips and the tire, and wherein the processor includes logic to analyze the frequency of contact and, based on the frequency of contact, estimate whether or not the vehicle is deviating into an oncoming lane.

16. A device adapted to determine whether a vehicle is deviating into an oncoming lane of an un-divided highway, comprising:
    a processor adapted to receive at least a first signal indicative of contact of a rumble strip with a tire of the vehicle, wherein the processor includes logic to:
       determine that the vehicle is deviating into an oncoming lane;
       initiate a vehicle control command to at least one of automatically steer the vehicle away from the oncoming lane and automatically brake the vehicle once the processor has received the first signal and has determined that the vehicle is deviating into an oncoming lane; and
       initiate a first warning to a driver of the vehicle once the processor has received the first signal and has determined that the vehicle is not deviating into an oncoming lane.

17. The device according to claim 16, wherein the device further includes:
    a vehicle control unit in communication with the processor, wherein the vehicle control unit is adapted to receive the vehicle control command from the processor and to at least one of automatically steer the vehicle away from the oncoming lane and automatically brake the vehicle once the processor has received the first signal and has determined that the vehicle is deviating into an oncoming lane.

18. The device according to claim 16, wherein the processor utilizes information based on GPS data to determine that the vehicle is deviating into an oncoming lane.

19. The device according to claim 16, wherein the first signal is also indicative of a type of rumble strip in contact with the tire, and wherein the processor includes logic to analyze the first signal and to determine that the vehicle is deviating into an oncoming lane based on the type of rumble strip in contact with the tire.

20. The device according to claim 16, wherein the first signal is also indicative of a frequency of contact between a plurality of rumble strips and the tire, and wherein the processor includes logic to analyze the frequency of contact and, based on the frequency of contact, determine that the vehicle is deviating into an oncoming lane.

21. The device according to claim 19, wherein the processor utilizes information based on GPS data to determine that the vehicle is deviating into an oncoming lane.

22. A device adapted to alter the stability characteristics of a vehicle after the vehicle has come into contact with a road departure warning installation installed on a road with respect to the vehicle, comprising:
   a processor adapted to receive at least a first signal indicative of contact of a rumble strip with a tire of the vehicle, wherein the processor includes logic to:
     determine that the vehicle is deviating from a road based at least on the first signal; and
     issue a command to change the state of a variable vehicle stability component or vehicle stability system once the processor has received the first signal and has determined that the vehicle is deviating from the road.

23. The device according to claim 22, further comprising a variable vehicle stability component or variable vehicle stability system in communication with the processor, wherein the variable vehicle stability component or stability system includes a vehicle suspension system, wherein the vehicle suspension system is automatically adjustable to increase the stability of the vehicle in response to the receipt of the command from the processor after the processor has determined that the vehicle is deviating from the road.

24. The device according to claim 23, wherein the vehicle suspension system includes a suspension spring or a shock absorber in communication with the processor, wherein a spring constant or a dampening factor of the suspension spring or the shock absorber, respectively, is automatically adjustable in response to the receipt of the command from the processor after the processor has determined that the vehicle is deviating from the road.

25. The device according to claim 22, further comprising a variable vehicle stability component or vehicle stability system, wherein the variable vehicle stability component or vehicle stability system includes a front-rear roll-rigidity proportion control unit, wherein the control unit is automatically adjustable to increase the stability of the vehicle in response to the receipt of the command from the processor after the processor has determined that the vehicle is deviating from the road.

26. The device according to claim 22, further comprising a variable vehicle stability component or vehicle stability system, wherein the vehicle stability component or vehicle stability system includes a device adapted to automatically lower the height of a vehicle in response to the receipt of the command from the processor after the processor has determined that the vehicle is deviating from the road.

27. The device according to claim 22, further comprising a variable vehicle stability component or vehicle stability system, wherein the vehicle stability component or vehicle stability system includes an automatic variable steering gear ratio control unit adapted to automatically vary the steering gear ratio in response to the receipt of the command from the processor after the processor has determined that the vehicle is deviating from the road.

28. A device adapted to determine the distance between a lane marker and a rumble strip, comprising:
   a processor adapted to:
     receive a first signal indicative of the crossing of a lane marker by a vehicle;
     receive a second signal indicative of a lateral speed of the vehicle;
     receive a third signal indicative of contact of a rumble strip with a tire of the vehicle;
     analyze the third signal and determine that the rumble strip has contacted the tire;
     determine the time period between receiving the first signal and receiving the third signal; and
     determine the distance between the lane marker and the rumble strip based on the time period between receiving the first signal and receiving the third signal and the lateral speed of the vehicle.

29. The device according to claim 28, wherein the distance ($Wln-rs$) between the lane marker and the rumble strip is determined based on the equation:

$$Wln-rs = Vltrl \cdot \Delta tln-rs$$

where,
   $Vltrl$ = lateral speed of the vehicle, and
   $\Delta tln-rs$ = time between crossing the lane marker and detecting the rumble strip.

30. The device according to claim 28, further comprising a sensor adapted to detect the lane marker and determine that the vehicle has crossed the lane marker.

31. A device adapted to alter vehicle stability in the event of road departure, comprising:
   a processor adapted to:
     receive a signal indicative of contact of a rumble strip with a tire of the vehicle;
     analyze the received signal and determine whether the rumble strip has contacted the tire;
     receive input relating to the distance of the rumble strip with respect to a lane marker;
     analyze the received input and determine the distance between the rumble strip and the lane marker;
   wherein the processor includes logic to:
     issue a command to change the state of a variable vehicle stability component or vehicle stability system once the processor has determined that the vehicle is in contact with the rumble strip, wherein a degree by which the state of the variable vehicle stability component or vehicle stability system is changed is determined by the distance between the rumble strip and the lane marker.

32. The device according to claim 31, wherein the degree by which the state of the variable vehicle stability component or vehicle stability system is commanded to change is greater the greater the distance between the rumble strip and the lane marker.

33. The device according to claim 31, wherein the degree by which the state of the variable vehicle stability component or vehicle stability system is commanded to change is greater the greater the distance between the rumble strip and the lane marker until the distance between the rumble strip and the lane marker is about equal to the tread width of the vehicle.

34. The device according to claim 31, wherein the degree by which the state of the variable vehicle stability component or vehicle stability system is commanded to change is greater the greater the distance between the rumble strip and the lane marker until the distance between the rumble strip and the lane marker is about equal to the tread width of the vehicle, after which the state of the variable vehicle stability component or vehicle stability system is not commanded to change.

35. A device adapted to alter vehicle stability in the event of road departure, comprising:
a processor adapted to:
receive a signal indicative of contact of a rumble strip with a tire of the vehicle;
analyze the received signal and determine that the rumble strip has contacted the tire;
receive input relating to the distance of the rumble strip with respect to a lane marker;
analyze the received input and determine the distance between the rumble strip and the lane marker; wherein the processor includes logic to:
initiate a vehicle control command to at least one of automatically steer the vehicle away from the rumble strip and automatically brake the vehicle once the processor has determined that the vehicle is in contact with the rumble strip, wherein a degree by which the vehicle is at least one of steered away from the rumble strip and automatically braked is determined by the distance between the rumble strip and the lane marker.

36. The device according to claim 35, wherein the degree by which the vehicle is commanded to at least one of steer away from the rumble strip and automatically brake is greater the greater the distance between the rumble strip and the lane marker.

37. The device according to claim 35, wherein the degree by which the vehicle is commanded to at least one of steer away from the rumble strip and automatically brake is greater the greater the distance between the rumble strip and the lane marker until the distance between the rumble strip and the lane marker is about equal to the tread width of the vehicle.

38. The device according to claim 35, wherein the degree by which the vehicle is commanded to at least one of steer away from the rumble strip and automatically brake is greater the greater the distance between the rumble strip and the lane marker until the distance between the rumble strip and the lane marker is about equal to the tread width of the vehicle, after which the degree by which the vehicle is at least one of steered away from the rumble strip and automatically braked is not changed.

39. A device adapted to make a driver of a vehicle aware of vehicle contact with a road departure warning installation installed on a road, comprising:
a processor adapted to:
receive a signal indicative of contact of a rumble strip with a tire of the vehicle;
analyze the received signal and determine that the rumble strip has contacted the tire;
issue a first command to a vehicle component control device to change the state of a vehicle component after determining that the rumble strip has contacted the tire; and
determine that the vehicle has traveled substantially further in the lateral direction beyond the contacted rumble strip after the vehicle has contacted the rumble strip and issue a second command to the vehicle component control device separate from the first command to change the state of a vehicle component after determining that the vehicle has traveled substantially further in the lateral direction.

40. The device according to claim 39, wherein the first command to the vehicle component control device is to momentarily tighten a driver's seatbelt and then to relax the driver's seatbelt, and wherein the second command to the vehicle component control device is to tighten the driver's seatbelt and maintain the seatbelt tightened for a substantial period of time.

41. The device according to claim 39, wherein the processor includes logic to:
determine that the vehicle has traveled substantially further in the lateral direction beyond the contacted rumble strip based on a lateral speed of the vehicle with respect to the rumble strip; wherein
the first command to the vehicle component control device is to momentarily tighten a driver's seatbelt and then to relax the driver's seatbelt, and wherein the second command to the vehicle component control device is to tighten the drivers's seatbelt and maintain the seatbelt tightened for a substantial period of time.

42. The device according to claim 39, wherein the processor includes logic to:
determine that the vehicle has traveled substantially further in the lateral direction beyond the contacted rumble strip based on a lateral speed of the vehicle with respect to the rumble strip; and
override the issuance of the second command if the lateral speed of the vehicle with respect to the rumble strip is greater than a predetermined speed; wherein
the first command to the vehicle component control device is to tighten at least one of a driver's seatbelt and a passenger's seatbelt.

43. The device according to claim 39, wherein the first command to the vehicle component control device is to open a driver's side window, and wherein the second command to the vehicle component control device is to close the driver's side window and maintain the window closed for a substantial period of time.

44. The device according to claim 39, wherein the processor includes logic to:
determine that the vehicle has traveled substantially further in the lateral direction beyond the contacted rumble strip based on a lateral speed of the vehicle with respect to the rumble strip; wherein
the first command to the vehicle component control device is to open a driver's side window, and wherein the second command to the vehicle component control device is to close the driver's side window and maintain the window closed for a substantial period of time.

45. The device according to claim 39, wherein the processor includes logic to:
determine that the vehicle has traveled substantially further in the lateral direction beyond the contacted rumble strip based on a lateral speed of the vehicle with respect to the rumble strip; and
override the issuance of the second command if the lateral speed of the vehicle with respect to the rumble strip is greater than a predetermined speed; wherein
the first command to the vehicle component control device is to close at least one of a driver's window and a passenger's window.

46. The device according to claim 39, wherein the first command to the vehicle component control device is to increase and then decrease the dampening factors of at least one vehicle shock absorber, and wherein the second command to the vehicle component control device is to increase the dampening factor of all of the vehicle shock absorbers and maintain them increased for a substantial period of time.

47. The device according to claim 39, wherein the processor includes logic to:
determine that the vehicle has traveled substantially further in the lateral direction beyond the contacted rumble strip based on a lateral speed of the vehicle with respect to the rumble strip; wherein
the first command to the vehicle component control device is to increase and then decrease the dampening factors of at least one vehicle shock absorber, and
wherein the second command to the vehicle component control device is to increase the dampening factor of all of the vehicle shock absorbers and maintain them increased for a substantial period of time.

48. The device according to claim 39, wherein the processor includes logic to:
determine that the vehicle has traveled substantially further in the lateral direction beyond the contacted rumble strip based on a lateral speed of the vehicle with respect to the rumble strip; and
override the issuance of the second command if the lateral speed of the vehicle with respect to the rumble strip is greater than a predetermined speed; wherein
the first command to the vehicle component control device is to increase the dampening factor of all of the vehicle shock absorbers and maintain them increased for a substantial period of time.

49. The device according to claim 39, wherein the first command to the vehicle component control device is to increase a front roll rigidity ratio of the vehicle, and wherein the second command to the vehicle component control device is to increase the dampening factor of all of a vehicle's shock absorbers and maintain them increased for a substantial period of time.

50. The device according to claim 39, wherein the first command to the vehicle component control device is to increase a dampening factor on front shock absorbers of the vehicle and decrease a dampening factor on rear shock absorbers, and wherein the second command to the vehicle component control device is to increase the dampening factor on the rear shock absorbers to about the dampening factor on the front shock absorbers.

51. The device according to claim 39, wherein the processor includes logic to:
determine that the vehicle has traveled substantially further in the lateral direction beyond the contacted rumble strip based on a lateral speed of the vehicle with respect to the rumble strip; wherein
the first command to the vehicle component control device is to increase a dampening factor on front shock absorbers of the vehicle and decrease a dampening factor on rear shock absorbers, and wherein the second command to the vehicle component control device is to increase the dampening factor on the rear shock absorbers to about the dampening factor on the front shock absorbers.

52. The device according to claim 39, wherein the first command to the vehicle component control device is to decrease a steering gear ratio of a steering gear ratio control system, and wherein the second command to the vehicle component control device is to increase a dampening factor of all of a vehicle's shock absorbers and maintain them increased for a substantial period of time.

53. The device according to claim 39, wherein the processor includes logic to:
determine that the vehicle has traveled substantially further in the lateral direction beyond the contacted rumble strip based on a lateral speed of the vehicle with respect to the rumble strip; wherein
the first command to the vehicle component control device is to decrease a steering gear ratio of a steering gear ratio control system, and wherein the second command to the vehicle component control device is to increase the dampening factor of all of a vehicle's shock absorbers and maintain them increased for a substantial period of time.

54. The device according to claim 39, wherein the first command to the vehicle component control device is to reduce the vehicle height by a predetermined amount, and wherein the second command to the vehicle component control device is reduce the vehicle height so that the vehicle height is lower than the vehicle height resulting from the first command.

55. The device according to claim 54, wherein the second command to the vehicle component control device is to reduce the vehicle height so that the vehicle height is as low as possible.

56. The device according to claim 39, wherein the processor includes logic to:
determine that the vehicle has traveled substantially further in the lateral direction beyond the contacted rumble strip based on a lateral speed of the vehicle with respect to the rumble strip; wherein
the first command to the vehicle component control device is to reduce the vehicle height by a predetermined amount, and wherein the second command to the vehicle component control device is to reduce the vehicle height so that the vehicle height is lower than the vehicle height resulting from the first command.

57. The device according to claim 29, wherein the processor includes logic to:
determine that the vehicle has traveled substantially further in the lateral direction beyond the contacted rumble strip based on a lateral speed of the vehicle with respect to the rumble strip; and
override the issuance of the second command if the lateral speed of the vehicle with respect to the rumble strip is greater than a predetermined speed; wherein
the first command to the vehicle component control device is to reduce the vehicle height so that the vehicle height is as low as possible.

* * * * *